United States Patent
Takahashi et al.

(10) Patent No.: US 8,733,513 B2
(45) Date of Patent: May 27, 2014

(54) DISK BRAKE

(75) Inventors: Katsuhiro Takahashi, Minami-Alps (JP); Shigoru Hayashi, Minami-Alps (JP); Yorihito Miura, Minami-Alps (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 343 days.

(21) Appl. No.: 12/977,629

(22) Filed: Dec. 23, 2010

(65) Prior Publication Data

US 2011/0155520 A1 Jun. 30, 2011

(30) Foreign Application Priority Data

Dec. 25, 2009 (JP) ................. 2009-296046

(51) Int. Cl.
*F16D 55/226* (2006.01)

(52) U.S. Cl.
USPC ....... 188/72.6; 188/71.9; 188/72.1; 188/72.3; 188/72.8; 188/73.41; 188/106 F; 188/196 D; 188/196 V

(58) Field of Classification Search
USPC ........ 188/72.6, 71.9, 72.4, 72.7, 72.9, 196 D, 188/196 V, 106 F
See application file for complete search history.

(56) References Cited

U.S. PATENT DOCUMENTS

| | | | |
|---|---|---|---|
| 6,651,784 B1* | 11/2003 | Barbosa et al. | 188/71.9 |
| 2004/0112689 A1 | 6/2004 | Nakayama et al. | |
| 2007/0045062 A1* | 3/2007 | Watada | 188/72.8 |
| 2008/0135354 A1* | 6/2008 | Petri et al. | 188/73.41 |

FOREIGN PATENT DOCUMENTS

| | | | | |
|---|---|---|---|---|
| GB | 2244530 A | * | 12/1991 | ............ F16D 65/56 |
| JP | 58 019139 | | 2/1983 | |
| JP | A 2003 029552 | | 1/2003 | |
| JP | A 2003 508705 | | 3/2003 | |
| JP | A 2003 514204 | | 4/2003 | |
| JP | 2004-286202 | | 10/2004 | |
| JP | 2004-314272 | | 11/2004 | |
| WO | WO 9532371 A1 | * | 11/1995 | ............ F16D 65/56 |
| WO | WO 01/18423 A1 | | 3/2001 | |
| WO | WO 01/34991 A1 | | 5/2001 | |

OTHER PUBLICATIONS

Office Action issued in Japanese Patent Application No. JP 2009-296046 on Jul. 9, 2013 with partial English Language Translation of thereof.
English Language Translation of Office Action issed in Japanese Application No. 2009-296046, dated Jan. 14, 2014.

* cited by examiner

*Primary Examiner* — Robert A Siconolfi
*Assistant Examiner* — San Aung
(74) *Attorney, Agent, or Firm* — Nixon & Vanderhye P.C.

(57) ABSTRACT

Provided is a disk brake in which a rotation control part for controlling relative rotation of a cartridge and a cylinder of a parking brake mechanism is formed at the cartridge and includes convex parts having curved surfaces and concave parts formed at the cylinder and having curved surfaces, and a spacer formed of stainless steel, resiliently fitted into an inner circumference of the cylinder and including arc part having the same shape as the concave parts is disposed between the convex parts and the concave parts.

11 Claims, 11 Drawing Sheets

FIG. 6A   FIG. 6B   FIG. 6C
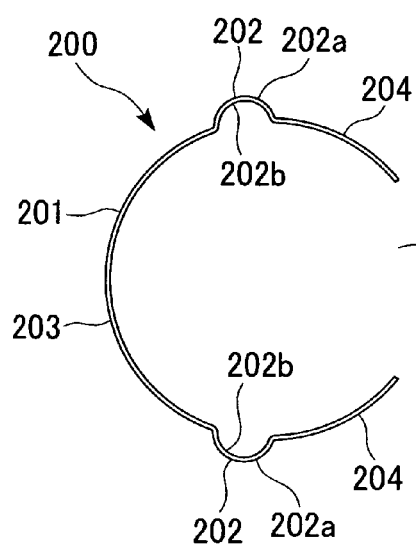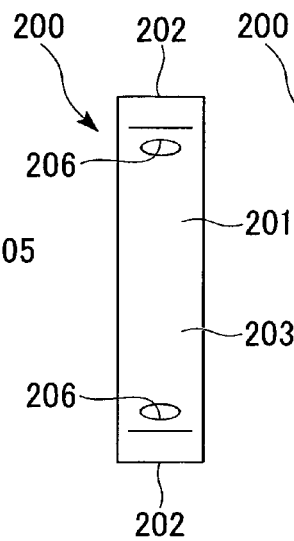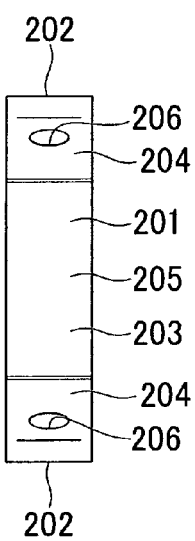
FIG. 7A
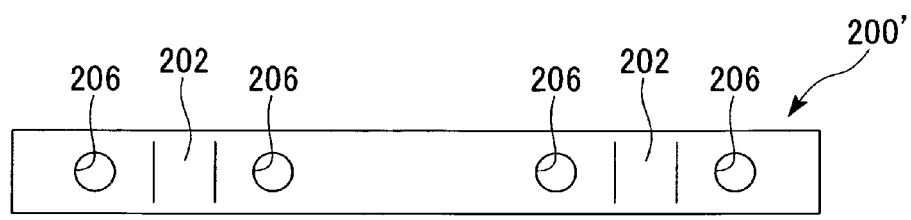
FIG. 7B
FIG. 7C
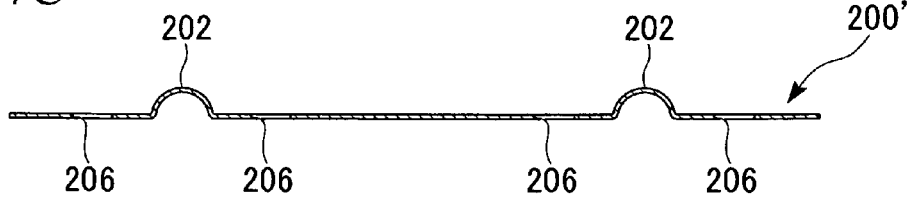

DISK BRAKE

BACKGROUND

1. Technical Field

The present invention relates to a disk brake.

This application claims priority to and the benefits of Japanese Patent Application No. 2009-296046 filed on Dec. 25, 2009; the disclosure of which is incorporated herein by reference.

2. Background Art

There is provided a disk brake having a parking brake mechanism for mechanically protruding a piston to press pads against a disk, generating a braking force (for example, see Japanese Patent Application, First publication No. 2004-286202).

When a cylinder of a caliper is made of an aluminum alloy material, a convex part for whirl-stopping the parking brake mechanism may abrade a concave part of the cylinder engaged with the convex part. For this reason, reliability of the disk brake may be degraded.

SUMMARY OF INVENTION

An object of the present invention is to provide a disk brake capable of improving reliability.

According to one aspect of the present invention, a disk brake includes a pair of pads disposed at both sides of a disk, as caliper for slidably fitting a piston into a bottomed cylinder formed of an aluminum alloy and bringing the pair of pads in contact with the disk using slide movement of the piston, a parking brake mechanism for generating a braking force having a spring cover into which a push rod and a push rod biasing spring are inserted, mechanically protruding the piston to press the pads against the disk, a rotation control part for controlling relative rotation provided in between the cylinder and a part of the parking brake mechanism that does not rotate with respect to the push rod, the rotation control part including convex parts having curved surfaces formed at the part of the parking brake mechanism that does not rotate with respect to the push rod and concave parts having curved surfaces formed at the cylinder, and a metal spacer resiliently disposed in an inner circumference of the cylinder and including arc part that contacts with the concave parts and disposed in the concave parts.

According to the present invention, it is possible to improve reliability of the disk brake.

BRIEF DESCRIPTION OF THE DRAWINGS

FIG. 6A is a front view showing a spacer of the disk brake in accordance with the first embodiment of the present invention;

FIG. 6B is a left side view showing the spacer of the disk brake in accordance with the first embodiment of the present invention;

FIG. 6C is a right side view showing the spacer of the disk brake in accordance with the first embodiment of the present invention;

FIG. 7A is a plan view showing an intermediate forming product of the spacer of the disk brake in accordance with the first embodiment of the present invention;

FIG. 7B is a front view showing the intermediate forming product of the spacer of the disk brake in accordance with the first embodiment of the present invention;

FIG. 7C is a front cross-sectional view showing the intermediate forming product of the spacer of the disk brake in accordance with the first embodiment of the present invention;

PREFERRED EMBODIMENTS

Hereinafter, embodiments of the present invention will be described with reference to the accompanying drawings.

First Embodiment

A first embodiment of the present invention will be described with reference to FIGS. 1 to 7C.

Figure 1:
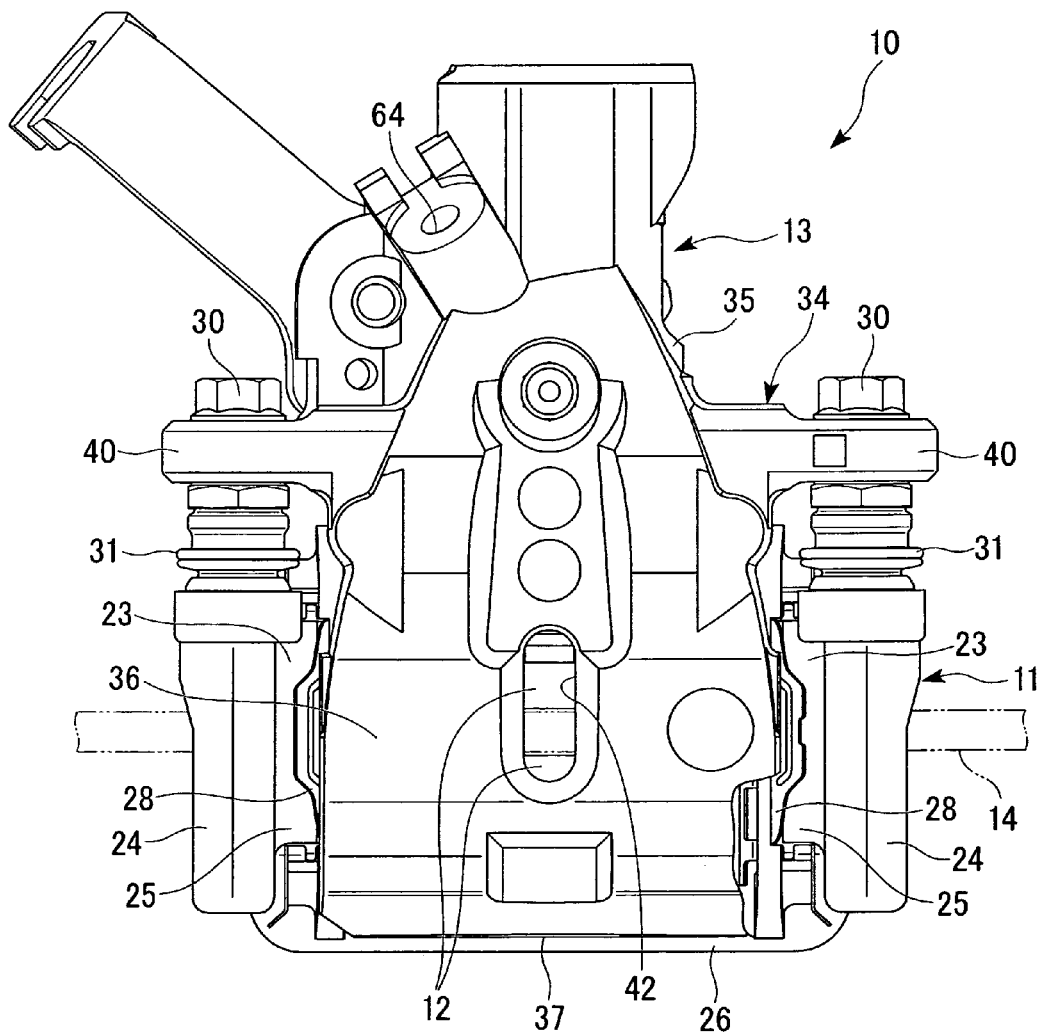
FIG. 1 is a plan view showing a disk brake in accordance with a first embodiment of the present invention.
Figure 2:
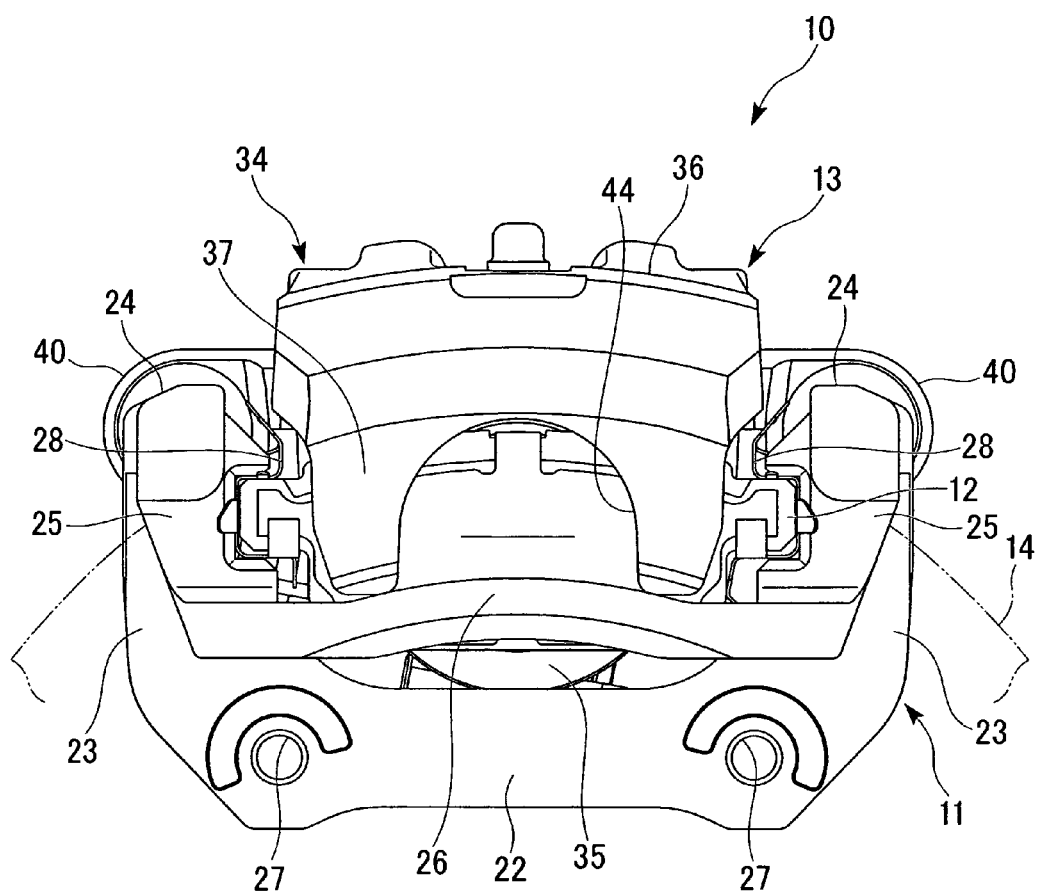
FIG. 2 is a front view showing the disk brake in accordance with the first embodiment of the present invention.

As shown in FIG. 1, a disk brake 10 of the first embodiment includes a carrier 11, a pair of pads 12, and a caliper 13. As shown in FIG. 2, the carrier 11 is disposed astride an outer diameter side of a disk 14 rotated with a wheel (not shown) to be braked, and fixed to a stationary part of a vehicle (not shown). The pair of pads 12 are disposed at both sides of the disk 14 to oppose each other via the disk 14 such that the pads 12 can be supported by the carrier 11 to be slid in an axial direction of the disk 14. The caliper 13 is supported by the carrier 11 to press the pads 12 against the disk 14 such that the caliper 13 can be slid in the axial direction of the disk 14 astride the outer diameter side of the disk 14, thereby applying a frictional resistance to the disk 14. In addition, hereinafter, a radial direction of the disk 14 will be referred to as a disk radial direction, an axial direction of the disk 14 will be referred to as a disk axial direction, and a rotational direction of the disk 14 will be referred to as a disk rotational direction.

The carrier 11 is integrally configured including a base plate 22 having attachment holes 27 to a vehicle, a pair of inner side pad support parts 23 slidably supporting an inner side pad 12 via a pair of pad guides 28, a pair of outer side pad support parts 25 slidably supporting an outer side pad 12 via the pair of pad guides 28, a pair of connecting parts 24 for connecting the inner side pad support parts 23 and the outer side pad support parts 25 as shown in FIG. 1, and a beam part 26 for connecting the pair of outer side pad support parts 25 as shown in FIG. 2.

As shown FIG. 1, support pins 30 are slidably fitted into the carrier 11 at positions of the pair of connecting parts 24 outside in the disk radial direction at both ends in the disk rotational direction to be slid from the inner sides in the disk axial direction. The caliper 13 is attached to the carrier 11 via these support pins 30. In addition, intermediate portions of the pair of support pins 30 between the caliper 13 and the carrier 11 are coated with elastic boots 31, respectively.

The caliper 13 has a caliper body 34 supported by the support pins 30 inserted into the carrier 11 astride the disk 14.

Figure 3:
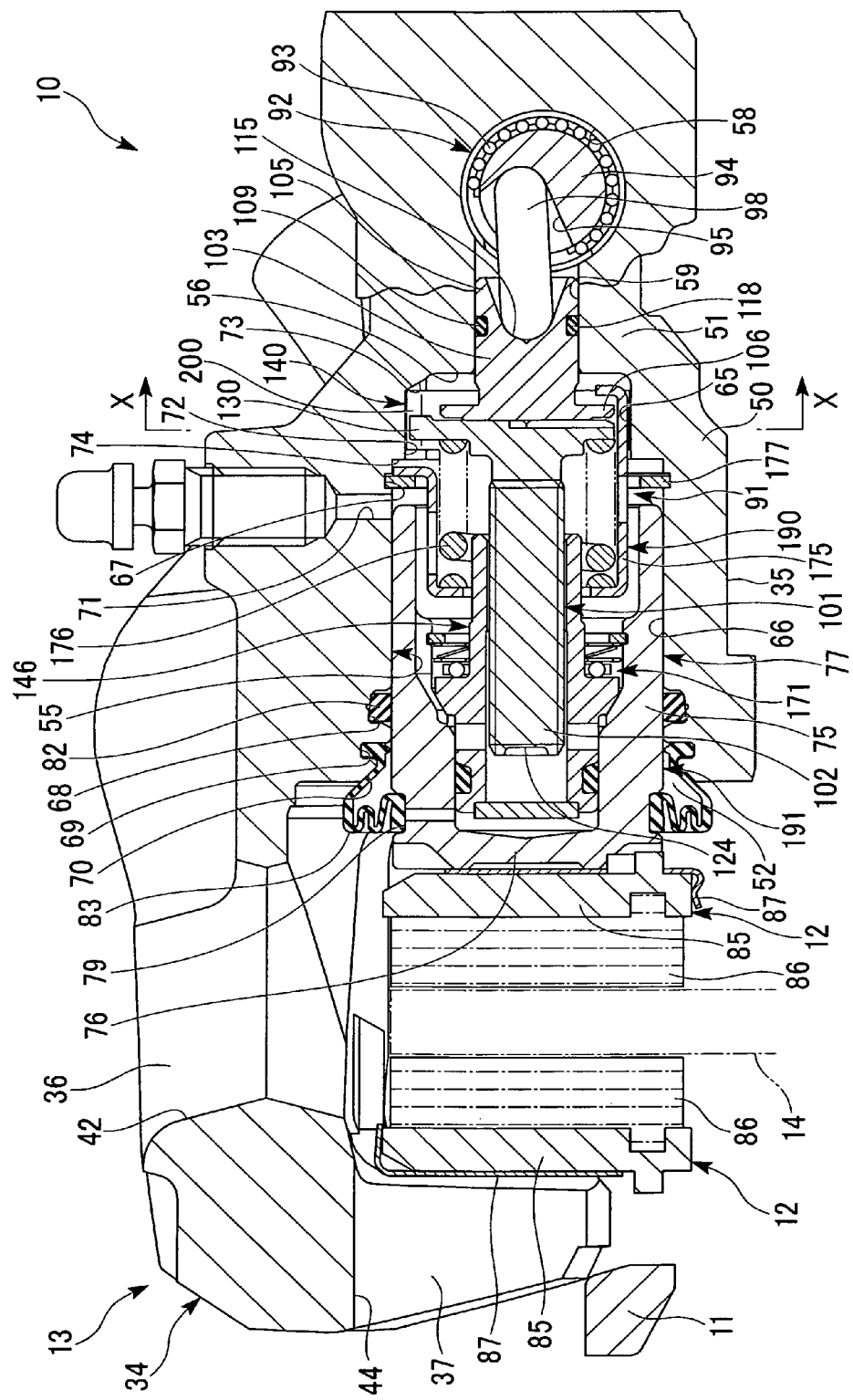
FIG. 3 is a lateral cross-sectional view showing the disk brake in accordance with the first embodiment of the present invention.

As shown in FIG. 3, the caliper body 34 includes a bottomed cylinder part (a cylinder) 35, a bridge part 36, and a claw part 37, which are integrally formed of an aluminum alloy.

The caliper body 34 of the caliper 13 is configured as a first type, in which the cylinder part 35 is provided at one surface side of the disk 14 and the claw part 37 is provided at the other surface side of the disk 14 such that the bridge part 36 connecting the claw part 37 and the cylinder part 35 is provided astride the disk 14.

As shown in FIG. 1, a pair of pin attachment parts 40 protruding from both sides in the disk rotational direction are formed in a middle part in the disk axial direction in the cylinder part 35 of the caliper body 34. The support pins 30 are fixed to the pin attachment parts 40.

The bridge part 36 is formed in the caliper body 34. The bridge part 36 is disposed along an outer circumference of the disk 14 to substantially form a plate shape closer to the claw part 37 than the pin attachment part 40. The bridge part 36 has a window part 42 formed at a center position in the disk rotational direction to pass through the bridge part 36 in the disk radial direction. The window part 42 enables a user to visually confirm a wear status of the pad 12.

As shown in FIG. 2, the claw part 37 is formed in the caliper body 34. The claw part has a plate shape and is disposed at an opposite side of the cylinder part 35 of the bridge part 36 and has a substantially constant width in the disk rotational direction. A recess 44 having a substantially semi-circular shape is formed in the claw part 37 in the disk axial direction such that a tool for machining the cylinder part 35 can pass therethrough.

As shown in FIG. 3, the cylinder part 35 of the caliper body 34 has a cylinder tube part 50 having a tubular shape and a cylinder bottom part 51 that closes one end of the cylinder tube part 50 in an axial direction, to form the bottomed cylindrical shape in which a cylinder opening part 52 is opposite to the inner side pad 12. Here, an inner circumference of the cylinder tube part 50 and a bottom surface 56 are referred to as a cylinder bore 55. In addition, a boundary of the cylinder part 35 between the cylinder tube part 50 and the cylinder bottom part 51 in the axial direction belongs to the bottom surface 56.

A cam hole 58 is formed in the cylinder bottom part 51 of the caliper body 34, is spaced apart from the bottom surface 56, and has a circular cross-section in a direction perpendicular to the axial direction of the cylinder part 35. In addition, the cylinder bottom part 51 has a bottom hole 59 having a circular cross-section passing from a center position of the bottom surface 56 to the cam hole 58 along the axial direction of the cylinder part 35.

Figure 4:
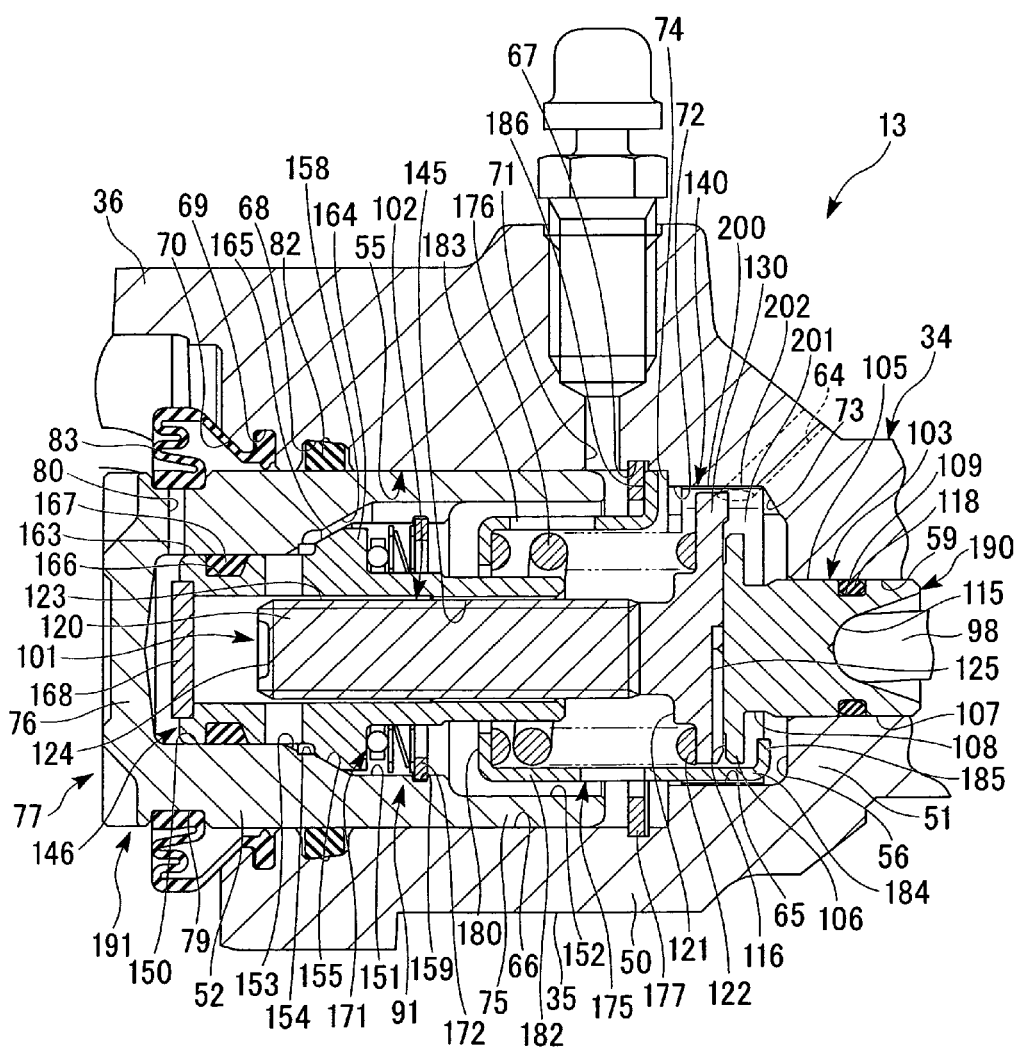
FIG. 4 is an enlarged lateral cross-sectional view showing major parts of the disk brake in accordance with the first embodiment of the present invention.

As shown in FIG. 4, the inner circumference of the cylinder tube part 50 of the caliper body 34 (the cylinder bore 55) has an inner hole 65 formed closest to the cylinder bottom part 51 and having a substantially circular cross-section in a concentric relationship with respect to the bottom surface 56. The cylinder tube part 50 of the caliper body 34 has an introduction hole 64 formed in an inner circumference of the inner hole 65 to introduce a brake fluid into the cylinder part 35. In the inner circumference of the cylinder tube part 50 of the caliper body 34 (cylinder bore 55), a sliding hole 66 having a circular cross-section with a larger diameter than that of the inner hole 65 is formed at the side closer to the cylinder opening part 52 than the inner hole 65 in a concentric relationship with respect to the inner hole 65. An annular ring groove 67 having a larger diameter than that of the sliding hole 66 is formed in the vicinity of an end of the inner hole 65 side of the sliding hole 66 in a concentric relationship with respect to the sliding hole 66. An annular seal groove 68 having a larger diameter than that of the sliding hole 66 is formed in the inner circumference of the cylinder tube part 50 (cylinder bore 55) in the vicinity of an end of the cylinder opening part 52 side of the sliding hole 66 in a concentric relationship with respect to the sliding hole 66. A stepped annular boot groove 69 formed of a large diameter part and a small diameter part, which are larger than that of the sliding hole 66, is formed at the side closer to the cylinder opening part 52 than the seal groove 68 in a concentric relationship with respect to the sliding hole 66. In addition, a tapered chamfer part 70 adjacent to the boot groove 69 is formed at a position of the cylinder opening part 52 of the inner circumference of the cylinder tube part 50 (cylinder bore 55) in a concentric relationship with respect to the sliding hole 66.

A bleeder hole 71 opened slightly nearer to the cylinder opening part 52 side than the ring groove 67 of the sliding hole 66 is formed in the cylinder tube part 50 of the caliper body 34 to be opened at the bridge part 36 side in the disk radial direction to pass through the cylinder tube part 50.

Figure 5:
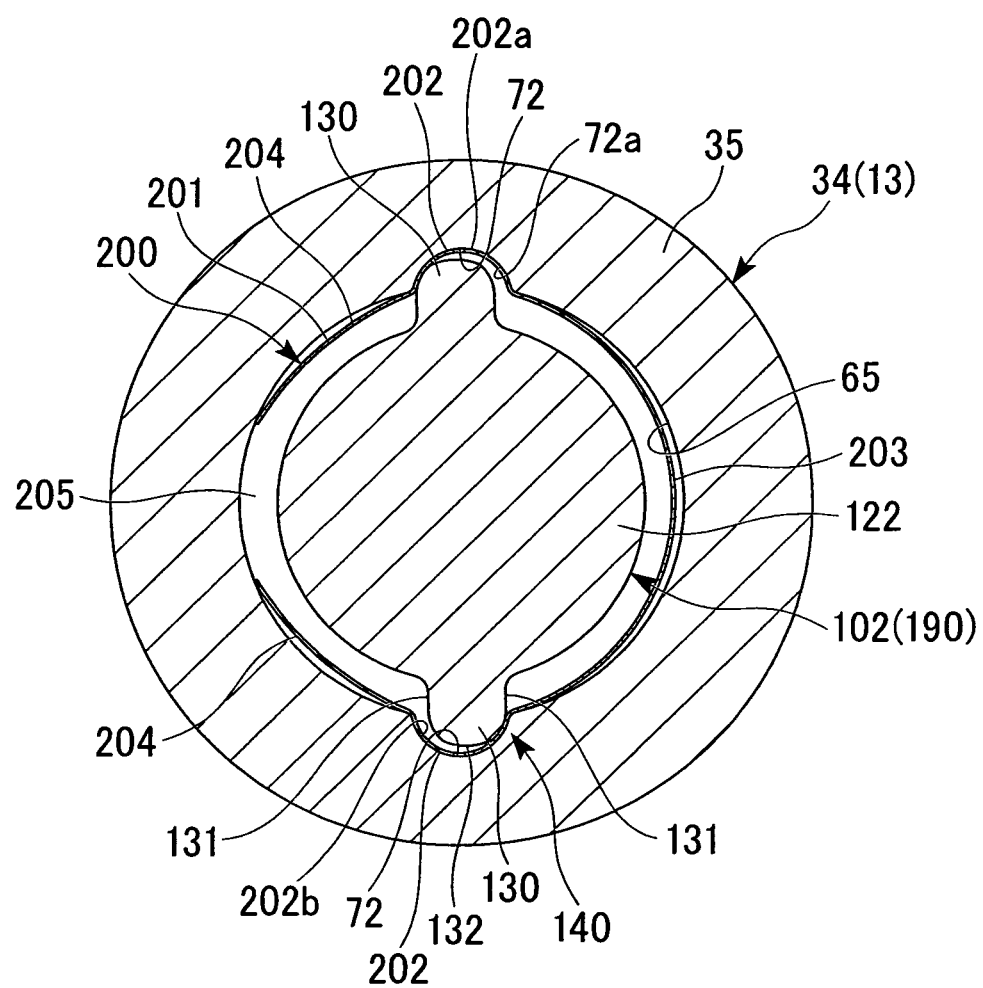
FIG. 5 is a cross-sectional view taken along line X-X of FIG. 3, showing a whirl-stop state of a caliper body and a front divided body of the disk brake in accordance with the first embodiment of the present invention.

An axial groove (concave part) 72 recessed in the radial direction and extending in the axial direction is formed in the inner circumference of the inner hole 65 of the cylinder tube part 50 of the caliper body 34. The axial groove 72 extends from a step surface 74 of the inner hole 65 and the sliding hole 66 to a front side of the bottom surface 56 adjacent to the cylinder bottom part 51. The axial groove 72 has the cross-section perpendicular to the axial direction of the cylinder part 35 being uniform regardless of axial positions, and as shown in FIG. 5, the axial groove 72 is disposed at two opposite places in the inner hole 65 at a 180° interval in a circumferential direction with the same shape. As shown in FIG. 4, an end of the axial groove 72 at the side of the bottom surface 56 is formed in a direction perpendicular to an axis of the cylinder part 35 such that a groove 73 having a cross-section that gradually reduces to about the bottom surface 56 side rather than the axial groove 72 extends from the axial groove 72.

In the first embodiment, a spacer 200 formed of a stainless steel plate is disposed inside the inner hole 65. As shown in FIGS. 6A to 6C, the spacer 200 includes a base plate 201 having an arc shape larger than a semicircle (i.e., a C shape), and two arc parts 202 protruding from predetermined positions of the base plate 201 in a semicircular shape outward in a radial direction to the same number and the same shape as the axial grooves 72. In addition, the base plate 201 is decoupled at a position between the arc parts 202. Accordingly, the base plate 201 includes an intermediate curved plate part 203 between the arc parts 202, and a pair of end-side curved plate parts 204 opposite to the intermediate curved plate part 203 between the arc parts 202. Opposite ends of the end-side curved plate parts 204 at both sides of the base plate 201 define an opening 205.

The spacer 200 has a uniform width in the axial direction and a substantial C shape since the base plate 201 as a major part has a C shape, in which the arc part 202 are formed at portions of the base plate 201. The base plate 201 of the spacer 200 has through-holes 206 formed in center positions in a width direction adjacent to the arc part 202 to pass through the base plate 201 the radial direction, i.e., the thickness direction. Specifically, the through-holes 206 are formed at the arc part 202 side of the one end-side curved plate part 204, both of the arc parts 202 side of the intermediate curved part 203, and the arc part 202 side of the other end-side curved plate part 204. In addition, the arc part 202 have a shape capable of engagement, with outer surfaces 202a thereof being cohered to inner surfaces 72a of the axial grooves 72.

Such a spacer 200 is made of an intermediate product 200' as shown in FIGS. 7A to 7C formed by providing a straight stainless steel plate having an uniform thickness and an uniform width, punching four circular through-holes 206 at predetermined positions and protruding two semi-circular arc part 202 at predetermined positions in the plate thickness direction through press forming. Next, the intermediate product 200' is formed to be curved in the plate thickness direction such that the are part protruded in the radial direction. In addition, the width of the spacer 200 is set to be larger than a length in which an axial length of a convex part of a push rod 101 is added to a moving stroke of the push rod 101, and equal to or less than the axial length of the axial groove 72.

A diameter of the base plate 201 of the spacer 200 in a natural state is larger than that of the inner hole 65 of the caliper body 34 in which the spacer 200 is disposed. Next, the spacer 200 is inserted into the inner hole 65 such that both of the end-side curved plate parts 204 disposed at both side in the circumferential direction approach each other, in other words, inserted into the inner hole 65 such that the opening 205 is resiliently narrowed, and at this time, the one arc part 202 is fitted to the one axial groove 72 and the other arc part 202 is fitted to the other axial groove 72. Next, the spacer 200 is in contact with the inner hole 63 due to return of the resilient deformation to be retained in the inner hole 65 by its elastic force. That is, the spacer 200 is resiliently fitted to the inner circumference of the cylinder part 35.

As shown in FIG. 5, in the retained state of the spacer 200, the arc part 202 are in the same shape as the inner surface 72a of the axial groove 72, thereby the outer surfaces 202a of the arc part 202 are entirely in contact with the inner surface 72a of the axial groove 72 and fit therein. In addition, in this retained state, the intermediate curved plate part 203 is spaced apart from the inner circumference of the inner hole 65 at the circumferential center part and approaches the inner circumference of the inner hole 65 as the intermediate curved plate part 203 come closer to the arc part 202, and the ends of the arc part 202 are in contact with the inner circumference of the inner hole 65. Further, in the retained state, the end-side curved plate parts 204 defining the opening 205 formed therebetween approach the inner circumference of the inner hole 65 as the intermediate part in the circumferential direction is spaced apart from the inner circumference of the inner hole 65 and comes closer to the arc part 202 or the opening 205, and the ends of the arc part 202 side or the ends of the opening 205 side are in contact with the inner circumference of the inner hole 65.

In addition, it is preferable that each outer surface 202a of the arc part 202 at both sides thoroughly contact with the inner surface 72a of the axial groove 72 from a point of view of prevention of noise generation and durability. However, the arc part 202 may have a shape that does not partly contact with the inner surface 72a of the axial groove 72 if the part is not subjected by a force.

Here, while the spacer 200 is retained in the inner hole 65 to cover the opening formed in the inner circumference of the inner hole 65 of the introduction hole 64 shown in FIG. 4, since the spacer 200 has the plurality of through-holes 206 formed in the radial direction as shown in FIGS. 6A to 6C, the through-holes 206 ensure that a brake fluid can flow in the cylinder part 35 through the introduction hole 64 to maintain introduction and discharge performance of the brake fluid in the cylinder part 35 through the introduction hole 64.

As shown in FIG. 4, the caliper 13 includes a piston 77 having an operculated tube shape having a cylindrical tube part 75 and a disk-type lid part 76. The piston 77 has an annular boot groove 79 recessed in the radial direction in the outer circumference at a side of the lid part 76, and a loophole 80 formed to pass through the tube part 75 in the radial direction to be opened inside the boot groove 79. The piston 77 is slidably fitted into the sliding hole 66 of the cylinder part 35 of the caliper body 34 to slide the tube part 75 toward the cylinder bottom part 51.

The caliper 13 includes a ring-shaped piston seal 82 retained in the seal groove 68 of the cylinder part 35 and sealing a gap between the piston 77 and the bore 55 of the cylinder part 35, and an extensible boot 83 having one end fitted to the boot groove 69 of the cylinder part 35 and the other end fitted to the boot groove 79 of the piston 77. The boot 83 is fitted to the boot groove 79 to be mounted on the piston 77 to close the loophole 80.

In the caliper 13, the piston 77 is slid in the sliding hole 66 of the cylinder part 35 to protrude in a direction of the pad 12 as shown in FIG. 3 by pressure of the brake fluid introduced between the cylinder part 35 and the piston 77 via the introduction hole 64. The piston 77 and the claw part 37 grip the pair of pads 12 at both sides to contact the pads 12 with the circular disk 14, pressing the pads 12 against the disk 14.

When a brake pedal is pressed by a driver's foot to perform normal braking, the piston 77 slides in the cylinder part 35 using the brake fluid pressure introduced into the cylinder part 35 from a master cylinder (not shown) to protrude from the cylinder part 35 toward the claw part 37 so that the pair of pads 12 come in contact with the disk 14 to generate a braking force. However, a parking brake mechanism 91 is provided in the cylinder part 35 to mechanically protrude the piston 77, not using the brake fluid pressure, to press the pair of pads 12 against the disk 14, generating a braking force.

The parking brake mechanism 91 includes a cam mechanism 92.

The cam mechanism 92 includes an arc-shaped bearing 93 fitted into a cam hole 58 of the caliper body 34, and a substantially columnar cam body 94 rotatably supported in the cam hole 58 via the bearing 93. The cam body 94 has a substantially V-shaped cam concave part 95 formed from an outer circumference to a center part in the radial direction. The most concave part of the cam concave part 95 is offset with respect to a central axis of the cam body 94.

The cam mechanism 92 includes a cam rod 98 having one end inserted into the cam concave part 95 and the other end disposed in the bottom hole 59. The cam rod 98 varies a protrusion amount from the cam body 94 according to the shape of the cam concave part 95 when the cam body 94 is rotated in a direction perpendicular to the axis of the cylinder part 35. That is, since a bottom part of the cam concave part 95 is offset with respect to the center of the cam concave part 94, when the cam body 94 is rotated, the bottom part moves with respect to the bottom hole 59 to vary the protrusion amount of the cam rod 98 abutting the bottom part. In addition, the cam body 94 is rotated by a manual operation of a parking brake lever (not shown) or driving of a motor of an electric cable puller via a connecting lever (not shown).

The push rod 101 is provided in the cylinder part 35 to be pressed by the cam rod 98 of the cam mechanism 92 to move in an axial direction of the cylinder part 35. The push rod 101 is divided into two parts in the axial direction, i.e. a front divided body 102 formed of iron and disposed at a front side, i.e., the piston 77 side, upon forward movement, and a rear divided body 103 formed of iron and disposed at a rear side, i.e., the cylinder bottom part 51 side, upon forward movement.

As shown in FIG. 4, the rear divided body 103 of the push rod 101 includes a columnar shaft part 105 inserted into the bottom hole 59 of the cylinder bottom part 51, and a disk-shaped flange part 106 extending from one end of the shaft part 105 in the radial direction in a concentric relationship with respect to the shaft part 105, which are integrally formed with each other.

The shaft part 105 includes a large diameter part 107 and a small diameter part 108 formed adjacent to the flange part 106 and having a smaller diameter than the large diameter part 107. The large diameter part 107 includes a seal groove 109 recessed radially inward in the middle of the axial direction in a concentric relationship with the large diameter part 107.

A substantially V-shaped cam concave part 115 is formed in the shaft part 105 on a center axis from an end surface thereof opposite to the flange part 106. The other end of the cam rod 98 is inserted into the cam concave part 115. In addition, an annular step part 116 recessed in a step shape is formed at an outer circumference of the flange part 106 opposite to the shaft part 105 in the axial direction in a concentric relationship. A tip surface of the flange part 106 except for the step part 116 is flat in a direction perpendicular to the axis.

The shaft part 105 of the rear divided body 103 is slidably inserted into the bottom hole 59 of the cylinder bottom part 51. At this time, a ring-shaped push rod seal 118 is disposed and retained in the seal groove 109. As a result, the push rod seal 118 normally closes the gap between the shaft part 105 of the rear divided body 103 and the bottom hole 59 of the cylinder part 35.

The front divided body 102 of the push rod 101 includes a substantially columnar shaft part 120, a substantially disk shaped step part 121 extending radially outward from one end of the shaft part 120 in a concentric relationship, and a substantially disk-shaped flange part 122 extending radially outward from a side opposite to the shaft part 120 of the step part 121 in a concentric relationship, which are integrally formed with each other.

A male thread 123 is formed on an outer circumference of the shaft part 120 in the radial direction except for a portion of the step part 121. In addition, a tool groove 124 is formed in an intermediate range of an end surface in the radial direction opposite to the step part 121 of the shaft part 120 so as to axially recessed and radially extends.

The flange part 122 has a groove 125 axially recessed in a surface opposite to the shaft part 120. The surface of the flange part 122 opposite to the shaft part 120 is a flat surface in a direction perpendicular to the axis except for the groove 125.

In addition, the front divided body 102 has convex parts 130 integrally formed therewith at the outer circumference of the flange part 122 and protruding radially outward. The convex parts 130 slightly protrude from the outer circumference of the flange 122 in the radial direction opposite to the shaft part 120. As shown in FIG. 5, when the front divided body 102 is viewed from the axial direction, the convex parts 130 each include a pair of extension surfaces 131 parallelly protruding from the outer circumference of the flange part 122 in the radial direction, and a curved tip surface 132 connecting protruded tips of the extension surfaces 131. The convex parts 130 are formed at two positions at 180° intervals in a circumferential direction of the flange part 122. In the present embodiment, the convex part 130 is provided directly on the outer circumference of the flange 122 of the front divided body 102 of the push rod 101, however, an embodiment of the present invention is not limited thereto. For example, the convex part 130 may be provided on a member that does not rotate with respect to the front divided body 102 of the push rod 101.

The front divided body 102 is disposed in the inner hole 65 making the outer diameter of the flange part 122 smaller than the inner diameter of the inner hole 65 of the cylinder part 35. At this time, a diameter of a circle corresponding to both outer ends of the pair of convex parts 130 is larger than the inner diameter of the inner hole 65, and smaller than a diameter of a circle corresponding to the most bottom positions of the inner surface 202b of the pair of arc part 202 of the spacer 200 fitted to the pair of axial grooves 72. Accordingly, the flange part 122 is disposed in the inner hole 65 in a state in which the pair of convex parts 130 of the front divided body 102 are disposed in the pair of arc part 202 in a one-to-one correspondence. As a result, rotation of the front divided body 102 relative to the cylinder part 35, which includes the pair of axial grooves 72 to which the pair of arc part 202 are fitted, is controlled due to the pair of convex parts 130 abutting the pair of arc part 202 in a one-to-one correspondence. In other words, the cylinder part 35 receives a rotational force introduced from the front divided body 102 via the convex parts 130 using the axial groove 72 via the arc part 202 of the spacer 200, thereby controlling the rotation of the front divided body 102. More specifically, the arc part 202 of the spacer 200 are disposed between the axial grooves 72, which controls the rotation of the front divided body 102 by receiving the convex parts 130, and the convex parts 130. In addition, the convex parts 130 abut the curved inner surfaces 202b of the arc part 202 at the curved tip surfaces 132.

The front divided body 102 causes the flange part 122 to abut the flange part 106 of the rear divided body 103, as shown in FIG. 4, when it is inserted into the inner hole 65 of the cylinder part 35. In addition, the convex parts 130 are disposed in the pair of arc part 202 of the spacer 200, thereby the relative rotation between the front divided body 102 and the cylinder body 35 is controlled. Further, the pair of convex parts 130 slide in the pair of arc part 202 of the spacer 200 in an axial direction of the cylinder part 35, and accordingly, the front divided body 102 can move in the axial direction of the cylinder part 35 in a state in which rotation relative to the cylinder part 35, in the cylinder part 35, is controlled, thereby the front divided body 102 can be separated from and approach the cylinder bottom part 51. Here, the convex parts 130 of the front divided body 102 and the axial grooves 72 of the cylinder part 35 constitute a rotation control part 140 for enabling the front divided body 102 to move in the axial direction while controlling rotation of the front divided body 102 of the push rod 101 relative to the cylinder part 35 in a circumferential direction of the cylinder. The arc parts 202 of the spacer 200 are disposed between the convex parts 130 and the axial grooves 72.

The parking brake mechanism 91 includes a tube-shaped clutch member 146 having a female threaded part 145 formed in an inner diameter side threadedly engaged with the male threaded part 123 of the front divided body 102 of the push rod 101 disposed in the cylinder part 35.

The inner diameter side of the piston 77 includes a small inner diameter part 150 formed at the lid part 76 side and having a small diameter, and an intermediate inner diameter part 151 formed at the opening side and having a diameter larger than that of the small inner diameter part 150. Further, a side of the inner diameter side of the piston 77 closer to the opening than the intermediate inner diameter part 151 is formed as a large inner diameter part 152 having a diameter larger than that of the intermediate inner diameter part 151.

In a sequence from the small inner diameter part 150, a tapered surface part 153 inclined such that a diameter continuously increases from the small inner diameter part 150 to the intermediate inner diameter part 151, a step part 154 having an annular step shape larger than a larger diameter side of the taper surface part 153, and a tapered surface part 155 inclined such that a diameter continuously increases from the step part 154 to the intermediate inner diameter part 151 are formed between the small inner diameter part 150 and the intermediate inner diameter part 151 in a concentric relationship with respect to the small inner diameter part 150 and the intermediate inner diameter part 151.

A communication groove 158 is axially formed in an inner diameter side of the piston 77 to pass through the intermediate inner diameter part 151 and the tapered surface part 155 to connect the large inner diameter part 152 and the step part 154. An annular locking groove 159 is formed in the intermediate inner diameter part 151, and the loophole 80 is formed in the opening 76 side of the small inner diameter part 150.

The clutch member 146 includes a fitting part 163 formed at a tip side and fitted to the small inner diameter part 150 of the piston 77, and a flange part 164 adjacent to the fitting part 163 and extending in the radial direction. A tapered part 165 in contact with the tapered surface part 155 of the piston 77 is formed at the side closer to the fitting part 163 of the flange part 164 in a concentric relationship. In addition, an annular seal groove 166 is formed in the fitting part 163 of the clutch member 146, and a ring-shaped clutch member seal 167 is retained in the seal groove 166. The clutch member seal 167 seals a gap between the fitting part 163 of the clutch member 146 and the small inner diameter part 150 of the piston 77. The clutch member 146 has a female thread 145 formed at the inner circumference opposite to the fitting part 163 such that an end of the fitting part 163 side of the inner circumference is covered by the lid 168.

Here, when the cam mechanism 92 shown in FIG. 3 is rotated to press the rear divided body 103 of the push rod 101 using the cam rod 98, the rear divided body 103 straightly moves in the axial direction, thereby the front divided body 102 of the push rod 101 is straightly moved in the axial direction by being pushed by the rear divided body 103. Then, the clutch member 146 is pressed by the front divided body 102 to be straightly moved in the axial direction, and the tapered surface part 165 of the clutch member 146 shown in FIG. 4 contacts with the tapered surface part 155 of the piston 77, thereby the piston 77 is forcedly slid along the cylinder part 35 toward the pads 12. That is, the push rod 101 is pressed against the cam rod 98 of the cam mechanism 92 shown in FIG. 3 to transmit the pressure to the piston 77.

In addition, the male thread 123 of the push rod 101 and the female thread 145 of the clutch member 146 shown in FIG. 4 are not rotated and have a clearance between the push rod 101 and the clutch member 146 movable to a predetermined amount in the axial direction.

Further, the loophole 80 of the lid 76 side of the piston 77 opens the gap between the piston 77 and the clutch member 146 to the atmosphere via the boot 83.

The parking brake mechanism 91 includes an adjustment part 171 for adjusting a relative position between the clutch member 146 and the push rod 101 in the cylinder part 35. The adjustment part 171 is a member supported between the piston 77 and the flange part 164 of the clutch member 146 by a C-shaped snap ring 172 locked by the locking groove 159 formed in the intermediate inner diameter part 151 of the piston 77. The adjustment part 171 rotates the clutch member 146 with respect to the front divided body 102 of the push rod 101 in a substantially stopped state to axially move in the axial direction following the piston 77 by threaded engagement of the female thread 145 and the male thread 123, when the piston 77 is moved in the axial direction by the brake fluid pressure introduced into the cylinder part 35. In addition, the adjustment part 171 does not rotate the clutch member 146 with respect to the push rod 101, when the push rod 101 is straightly moved in the axial direction, and as a result, the male thread 123 and the female thread 145 straightly move the clutch member 146 with the push rod 101. The front divided body 102 of the push rod 101 includes the male thread 123 for adjusting an axial position of the clutch member 146 of the shaft part 120 extending in the axial direction of the cylinder part 35, i.e., adjusting the entire length in which the clutch member 146 is added.

The parking brake mechanism 91 includes a cover member (spring cover) 175 in which the push rod 101 is inserted, a push rod biasing spring 176 having a predetermined diameter, inserted into the cover member 175, disposing the step part 121 of the front divided body 102 inside thereof, and disposed between the flange part 122 of the front divided body 102 and the piston 77 of the cover member 175 to bias the front divided body 102 toward the rear divided body 103, and a C-shaped snap ring 177 fitted to the ring groove 67 of the cylinder part 35 and locking the cover member 175 to the cylinder part 35 to control movement in a direction of the cylinder opening part 52. The cover member 175, the push rod biasing spring 176 and the snap ring 177 are also disposed in the cylinder part 35.

The cover member 175 includes a ring-shaped bottom part 180 into which the clutch member 146 is inserted inside thereof, and a cylindrical part 182 extending from an outer edge of the ring-shaped bottom part 180 to one side in the axial direction to form a substantially cylindrical shape. In addition, the cover member 175 includes a plurality of extension parts 184 having a certain width from the cylindrical part 182 in the circumferential direction, extending in the axial direction at an opposite side of the ring-shaped bottom part 180, and formed at predetermined intervals in the circumferential direction (only one is shown in a cross-sectional view of FIG. 4). Further, the cylindrical part 182 includes a plurality of loopholes 183 for visually confirming the inside thereof upon assembly and weight saving.

Ends of the extension parts 184 opposite to the cylindrical part 182 are bent radially inward to form inner locking pieces 185. A plurality of outer locking pieces 186 (only one is shown in a cross-sectional view of FIG. 4) are formed between the extension parts 184 adjacent to each other in the circumferential direction and extend from an end of the cylindrical part 182 opposite to the ring-shaped bottom part 180 to be bent outward in the radial direction. The inner locking pieces 185 and the outer locking pieces 186, which are alternately disposed in the circumferential direction, are disposed parallel to the ring-shaped bottom part 180.

The cover member 175 is locked by the plurality of outer locking pieces 186 at the side closer to the cylinder bottom part 51 of the snap ring 177 retained in the ring groove 67 of the cylinder tube part 50. As a result, movement toward the cylinder opening part 52 is controlled. In addition, the inner locking pieces 185 of the plurality of extension parts 184 of the cover member 175 can lock the flange part 106 of the rear divided body 103 of the push rod.

The front divided body 102 and the rear divided body 103 constituting the push rod 101, the push rod biasing spring 176, and the cover member 175 are assembled in advance so as to form one assembled cartridge, and are assembled to the cylinder part 35 of the caliper body 34.

For example, the cover member 175 having a shape in which only the inner locking pieces 185 are not bent with respect to the extension parts 184 is prepared, and the push rod biasing spring 176 is inserted inside the cover member 175 to abut the ring-shaped bottom part 180. Then, the front divided body 102 of the push rod 101 is inserted into the push rod biasing spring 176, with the shaft part 120 being at the front, and the convex parts 130 are inserted between the extension parts 184 of the cover member 175. Then, the flange part 122 of the front divided body 102 is caused to abut the push rod biasing spring 176. Next, the flange part 106 of the rear divided body 103 of the push rod 101 is caused to abut the flange part 122 of the front divided body 102. Then, in this state, in an opposite side of the front divided body 102 rather than the flange part 122 of the rear divided body 103, all the inner locking pieces 185 are, bent inward in the radial direction of the cover member 175.

Accordingly, separation of the rear divided body 103 from the cover member 175 is controlled, and as a result, separation of the front divided body 102 and the push rod biasing spring 176 from the cover member 175 is controlled. In addition, the convex parts 130 are inserted between the extension parts 184 of the cover member 175 such that rotation of the cover member 175 relative to the front divided body 102 is controlled.

Thus, a cartridge 190 as a single assembly, which is configured of the front divided body 102 and the rear divided body 103 constituting the push rod 101, the push rod biasing spring 176, and the cover member 175, is assembled. In addition, a bending position of the inner locking pieces 185 of the cover member 175 is set such that the length of the push rod biasing spring 176 when integrated with the cartridge 190 is smaller than a free length.

Next, the cartridge 190 assembled as described above is inserted into the cylinder part 35 (cylinder bore 55) of the caliper body 34 shown in. FIG. 3. Prior to the insertion, the cam body 94 is disposed in the cam hole 58 of the cylinder bottom part 51 via the bearing 93 in the caliper body 34, and the cam rod 98 is inserted into the bottom hole 59 of the caliper body 34 and the cam concave part 95 of the cam body 94 from the cylinder opening part 52 in a state in which the cam concave part 95 of the cam body 94 is directed to the bottom hole 59. In addition, the spacer 200 is retained in the inner hole 65 by its elastic force in a state in which the pair of arc parts 202 are fitted into the pair of axial grooves 72.

When the cartridge 190 is inserted into the cylinder part 35, the push rod seal 118 is fitted into the seal groove 109 of the shaft part 105 of the rear divided body 103 protruding from the cover member 175. Next, the cartridge 190 is inserted into the cylinder tube part 50 from the cylinder opening part 52, with the rear divided body 103 being at the front. At this time, first, the shaft part 105 of the rear divided body 103 is inserted into the bottom hole 59 of the cylinder bottom part 51. As a result, movement of the cartridge 190 in the radial direction of the cylinder part 35 is controlled.

Further, when the shaft part 105 of the rear divided body 103 is inserted into the bottom hole 59, the convex parts 130 of the front divided body 102, which is formed to protrude outward in the radial direction of the cartridge 190, abut the bottom surface 74 of the sliding hole 66 of the cylinder tube part 50. A flathead screwdriver, etc., is inserted into the tool groove 124 from this state to rotate the front divided body 102, matching a phase of the pair of convex parts 130 to a phase of the pair of arc part 202 of the spacer 200 fitted to the pair of axial grooves 72.

As a result, further insertion of the cartridge 190 becomes possible. The further insertion of the cartridge 190 is performed while the pair of convex parts 130 are being moved in the axial direction of the cylinder part 35 in the pair of arc part 202 of the spacer 200, such that the cam concave part 115 of the rear divided body 103 abuts the cam rod 98 to stop the cartridge 190. In addition, at this time, the cartridge 190 is configured such that the cover member 175 is whirl-stopped with respect to the front divided body 102 by the pair of convex parts 130. The pair of convex parts 130 are disposed in the pair of arc part 202 of the spacer 200 to be whirl-stopped at the cylinder part 35 having the pair of axial grooves 72 to which the arc part 202 are fitted. As a result, rotation of the cover member 175 and the front divided body 102 relative to the cylinder part 35 is controlled.

A rotation control part 140 includes the convex parts 130 of the front divided body 102 and the axial grooves 72 of the cylinder part 35, and is provided outside the cartridge 190 in the radial direction, to control relative rotation between the cartridge 190 including the front divided body 102 and the cylinder part 35 in the circumferential direction of the cylinder. Then, the spacer 200 formed of a stainless steel material and including the arc part 202 having the same shape as the axial groove 72 is disposed between the convex parts 130 and the axial grooves 72 and resiliently fitted into the inner circumference of the cylinder part 35.

After the cartridge 190 is inserted into the cylinder part 35 as described above, the snap ring 177 is mounted in the cylinder part 35. That is, the snap ring 177 is inserted from the cylinder opening part 52 as shown in FIG. 4, and the outer locking pieces 186 of the cover member 175 are pressed by the snap ring 177 to push the cartridge 190 including the cover member 175 into the cylinder bottom part 51. Then, first, the cam rod 98 is retained between the cam concave part 115 of the rear divided body 103 and the cam concave part 95 of the cam body 94 shown in FIG. 3 to stop the rear divided body 103. In addition, when the cover member 175 is pressed into the cylinder bottom part 51 to overcome a bias force of the push rod biasing spring 176, as shown in FIG. 4, the snap ring 177 is fitted into the ring groove 67 to be mounted in the cylinder part 35 to lock the outer locking pieces 186 of the cover member 175.

As a result, separation of the cartridge 190 from the cylinder part 35 is stopped by the snap ring 177. In this state, the inner locking pieces 185 of the cartridge 190 are configured not to abut the bottom surface 56 of the cylinder bottom part 51. In addition, in this state, the rear divided body 103 and the front divided body 102 change a length of the push rod biasing spring 176 by abutting the cam rod 98 to set to a predetermined set length, generating a clearance between the flange part 106 of the rear divided body 103 and the inner locking pieces 185 of the cover member 175. According to the above constitution, simultaneously with positioning of the push rod 101, the push rod biasing spring 176 is set to separate the front divided body 102 from the rear divided body 103 to a predetermined clearance.

Meanwhile, the clutch member 146 on which the clutch member seal 167 is mounted is fitted to the piston 77, and simultaneously, the adjustment part 171 is locked to the piston 77 by the snap ring 172, so that the piston 77, the clutch member 146 and the adjustment part 171 constitute another piston assembly 191.

Then, in the caliper body 34, the piston seal 82 inserted from the cylinder opening part 52 is fitted into the seal groove 68 of the cylinder tube part 50, and simultaneously, one side of the boot 83 is fitted to the boot groove 69 of the cylinder part 35. Then, the piston assembly 191 is fitted into the sliding hole 66 of the cylinder tube part 50, with the opening of the piston 77 being at the front, to threadably engage the male thread 123 of the push rod 101 of the cartridge 190 with the female thread 145 of the clutch member 146. As a result, the piston assembly 191 is disposed in the cylinder part 35. Then, the other side of the boot 83 is fitted into the boot groove 79 of the piston 77.

As described above, the caliper 13 is assembled.

In the disk brake 10 having the above configuration, when the parking brake lever or the parking brake pedal (not shown) is operated to rotate the cam body 94 of the cam mechanism 92, the cam concave part 95 of the cam member 39 varies a protrusion amount of the cam rod 98 from a small to large extent so that the rear divided body 103 and the front divided body 102 straightly move toward the disk 14 in an abutting state. Then, the front divided body 102 of the push rod 101 moves the pair of convex parts 130 within the pair of arc part 202 of the spacer 200 fitted to the pair of axial grooves 72 of the cylinder part 35 so that the front divided body 102 moves toward the disk 14 without rotation relative to the cylinder part 35. Then, the clutch member 146 moves with the front divided body 102 to move the piston 77 toward the disk 14, mechanically pressing the pair of pads 12 against the disk 14.

Meanwhile, when the brake fluid pressure is introduced between the cylinder part 35 and the piston 77 through a brake operation by a conventional brake pedal, the fluid pressure is applied to the piston 77 with respect to a pressure receiving area by the piston seal 82 to generate a propulsion force toward the disk 14. However, the fluid pressure is also applied to the clutch member 146 with respect to the pressure receiving area by the clutch member seal 167 to generate a propulsion force toward the disk 14 and axially move to press the piston 77, not rotating to the clearance of the threaded engagement between the female thread 145 and the male thread 123 of the push rod 101 in the initial state.

Then, when the brake fluid pressure is further introduced into the cylinder part 35 to a predetermined fluid pressure or more, the clutch member 146 is pressed against the piston 77 by the fluid pressure applied to the clutch member 146, the fluid pressure is applied to the piston 77 to generate a propulsion force toward the disk 14, and the fluid pressure is also applied to the clutch member 146 to generate a propulsion force toward the disk 14.

At this time, meanwhile, the fluid pressure is also applied to the rear divided body 103 of the push rod 101 through the pressure receiving area by the push rod seal 118 to generate a propulsion force in a direction opposite to the disk 14. However, since the push rod 101 is divided into two parts as the front divided body 102 and the rear divided body 103 as described above, the propulsion force of the rear divided body 103 in a direction opposite to the disk 14 is separated from the propulsion force generated in the front divided body 120 toward the disk 14. As a result, loss in piston output upon the high fluid pressure is suppressed.

In the disk brake of Japanese Patent Application, First publication No. 2004-286202, convex parts provided at a cartridge of one assembly constituting a parking brake mechanism are inserted into concave parts formed in a cylinder of a caliper. As the convex parts abut the concave parts, relative rotation between the cartridge and the cylinder in a circumferential direction of the cylinder is controlled. For this reason, when at least the cylinder of the caliper is formed of an aluminum alloy for the purpose of saving weight, the concave parts of the cylinder may be abraded by the convex parts of the parking brake mechanism, thereby a reliability of the disk brake decreases.

In this regard, according to the disk brake 10 of the first embodiment, the rotation control part 140 for controlling relative rotation between the cylinder part 35 of the caliper body 34 formed of an aluminum alloy and the cartridge 190 constituting the brake mechanism 91 in a circumferential direction of the cylinder includes the convex parts 130 formed of iron, disposed at the cartridge 190 and having curved tip surfaces 132, and the axial grooves 72 formed at the cylinder part 35 and having curved inner surfaces 72a. The spacer 200 formed of stainless steel and including the arc part 202 having the same shape as the axial grooves 72 is disposed between the convex parts 130 and the axial grooves 72 to be resiliently fitted to the inner circumference of the cylinder part 35. Accordingly, since the convex parts 130 do not directly abut the axial grooves 72 even when a large rotational force is applied to the convex parts 130, the cylinder part 35 formed of an aluminum alloy is not abraded by the convex parts 130 formed of iron, preventing contaminations due to abraded foreign substances and reliability can be improved.

In addition, while the spacer 200 may be formed of a steel plate other than the stainless steel or may be appropriately surface-treated, the stainless steel can increase slidability of the push rod 101 to improve responsiveness of the parking brake mechanism.

Further, since the spacer 200 includes the arc part 202 having the same shape as the axial grooves 72 and resiliently fitted to the inner circumference of the cylinder part 35, the arc part 202 do not rotate with respect to the axial grooves 72 in the circumferential direction of the cylinder, and the arc part 207 do not abrade the cylinder part 35 formed of an aluminum alloy. Accordingly, reliability may be further improved.

Furthermore, since the spacer 200 has a substantial C-shape and the arc part 202 formed at portions thereof, the spacer 200 can be resiliently fitted to the inner circumference of the cylinder part 35 easily and reliably. Accordingly, reliability may be still further improved.

In addition, since the introduction hole 64 for a brake fluid as an operating fluid is formed at the inner hole 65 into which the spacer 200 of the cylinder part 35 is fitted, the spacer 200 blocks the introduction hole 64. However, the spacer 200 is provided with the plurality of through-holes 206. For this reason, the through-holes 206 secure introduction and discharge of the brake fluid into/from the cylinder part 35 through the introduction hole 64. Accordingly, it is possible to maintain introduction and discharge performance of the brake fluid into/from the cylinder part 35 through the introduction hole 64.

Further, since the convex parts 130 are formed at the push rod 101 moving in the cartridge 190 in the axial direction, when the curved inner surfaces 72a of the axial grooves 72 of the cylinder part 35 are abraded or indented by the convex parts 130, slidability of the push rod 101 in the axial direction is decreased. Even in this case, the spacer 200 can secure slidability of the push rod 101 in the axial direction.

Furthermore, in the first embodiment, while the cartridge 190 includes the front divided body 102, the rear divided body 103, the push rod biasing spring 176 and the cover member 175, the cartridge 190 may include the front divided body 102, the push rod biasing spring 176 and the cover member 175, without including the rear divided body 103. In addition, the push rod, the push rod biasing spring 176 and the cover member 175 may be separately assembled to the cylinder part 35, not constituting the cartridge.

Second Embodiment

Hereinafter, a second embodiment will be described with reference to FIGS. 8 to 12, specifically describing different parts than the first embodiment. In addition, like elements with the first embodiment are designated by like reference numerals.

Figure 8:
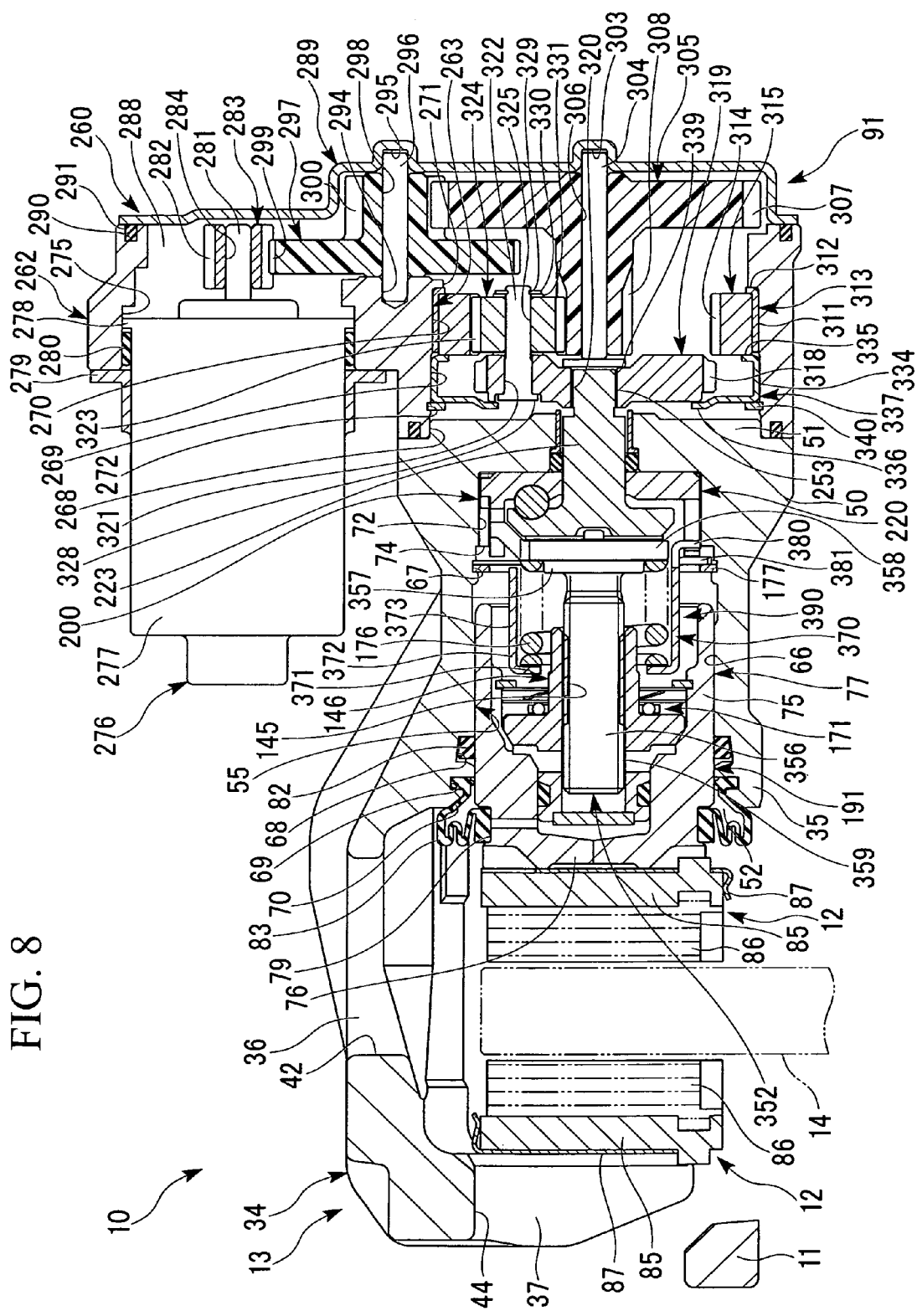
FIG. 8 is a lateral cross-sectional view showing a disk brake in accordance with a second embodiment of the present invention.
Figure 9:
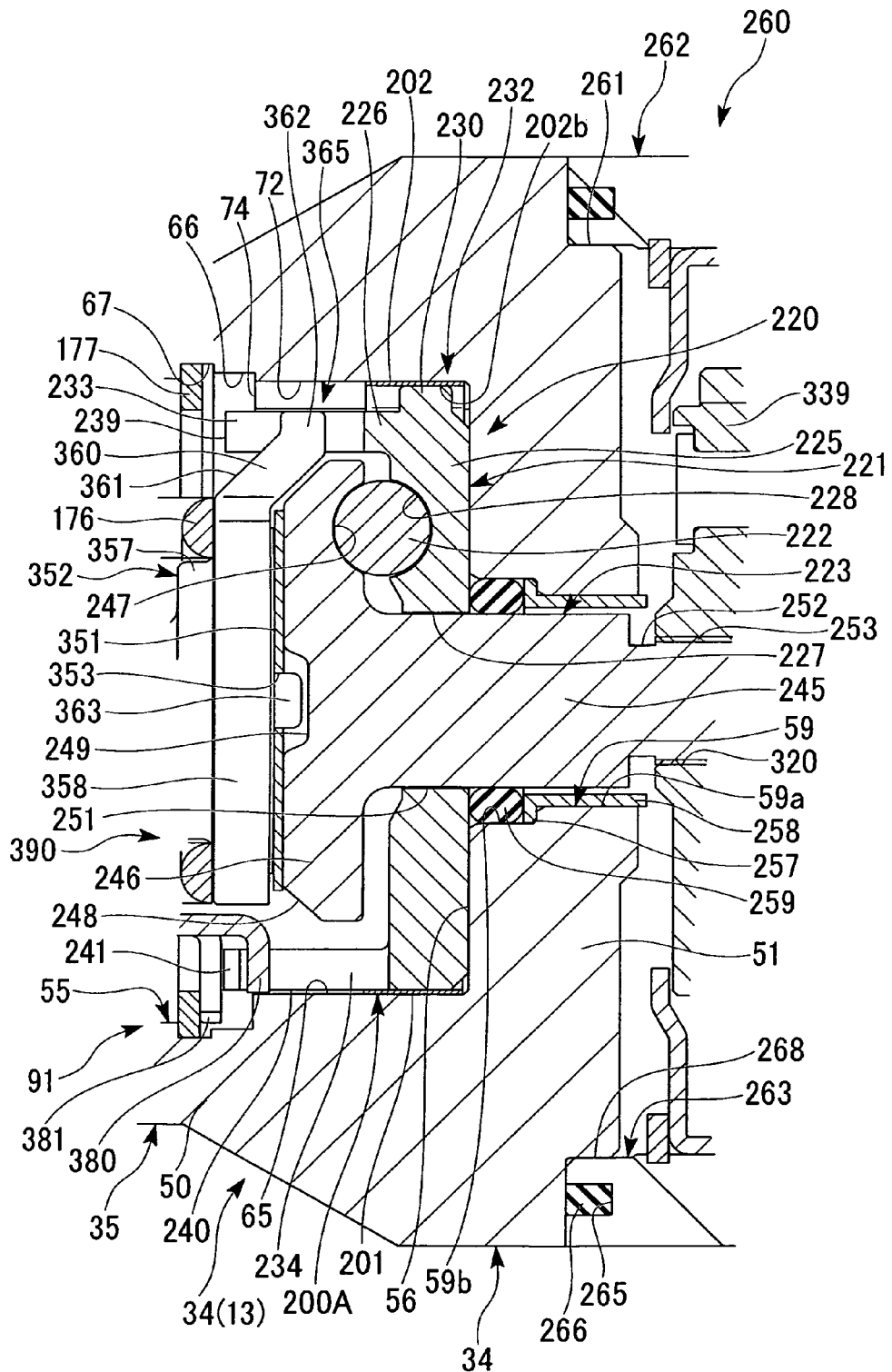
FIG. 9 is an enlarged lateral cross-sectional view showing major parts of the disk brake in accordance with the second embodiment of the present invention.

In the second embodiment, a parking brake mechanism 91 is different from that in the first embodiment, as shown in FIG. 8. The parking brake mechanism 91 of the second embodiment includes a ball and ramp mechanism 220 disposed in a cylinder part 35 of a caliper body 34 so that a portion thereof protrudes from a bottom hole 59 of a cylinder bottom part 51 outward, as shown in FIG. 9.

The ball and ramp mechanism 220 converts a rotational force into a straight propulsion force. The ball and ramp mechanism 220 includes a non-rotation fixed ramp member 221, disposed in the cylinder part 35 and abutting the cylinder bottom part 51, a ball 222 provided at the fixed ramp member 221 opposite to the cylinder bottom part 51, and a movable ramp member 223, which is turnable, provided to interpose the ball 222 between the fixed and movable ramp members 221 and 223.

The fixed ramp member 221 is formed of iron by forging. The fixed ramp member 221 is formed as a cup shape. The fixed ramp member 221 includes a circular plate part 225 abutting the cylinder bottom part 51, and a sidewall part 226 extending from an outer circumference of the circular plate part 225 in an axial direction to form a substantially cylindrical shape to a certain height. The circular plate part 225 has a through-hole 227 formed at a center portion thereof in the axial direction. A plurality of ramp grooves 228 (only one is shown in FIG. 8) are formed at a surface of the sidewall part 226 of the circular plate part 225 between the through-hole 227 and the sidewall part 226 at predetermined intervals in the circumferential direction of the ramp groove 228. While not shown, the ramp groove 228 has a mirror symmetrical shape with respect to a center portion in the circumferential direction of the circular plate part 225 such that a depth of the ramp groove 228 in the circumferential direction is largest at the center portion and gradually decreases toward both sides in the circumferential direction of the circular plate part 225. In the fixed ramp member 221, the ball 222 is disposed in the ramp groove 228.

Convex parts 230 radially protrude outward from the outer circumference of the circular plate part 225 of the fixed ramp member 221. When the fixed ramp member 221 is viewed from the axial direction as shown in FIG. 10B, the convex parts 230 each have a curved outer surface 231 protruding from the outer circumference of the circular plate part 225 in a semi-circular shape and are formed at three 120° intervals in the circumferential direction of the circular plate part 225 in the same shape.

As shown in FIG. 9, also in the second embodiment, the axial grooves 72 having substantially the same shape as those in the first embodiment are formed in an inner circumference of an inner hole 65 of a cylinder tube part 50. The second embodiment differs from the first embodiment in that the axial grooves 72 are formed in a certain cross-sectional shape to the bottom surface 56 of the cylinder bottom part 51 and the axial grooves 72 are formed at three different positions at 120C intervals (only one is shown in FIG. 9) in the circumferential direction of the inner hole 65.

Figure 11:
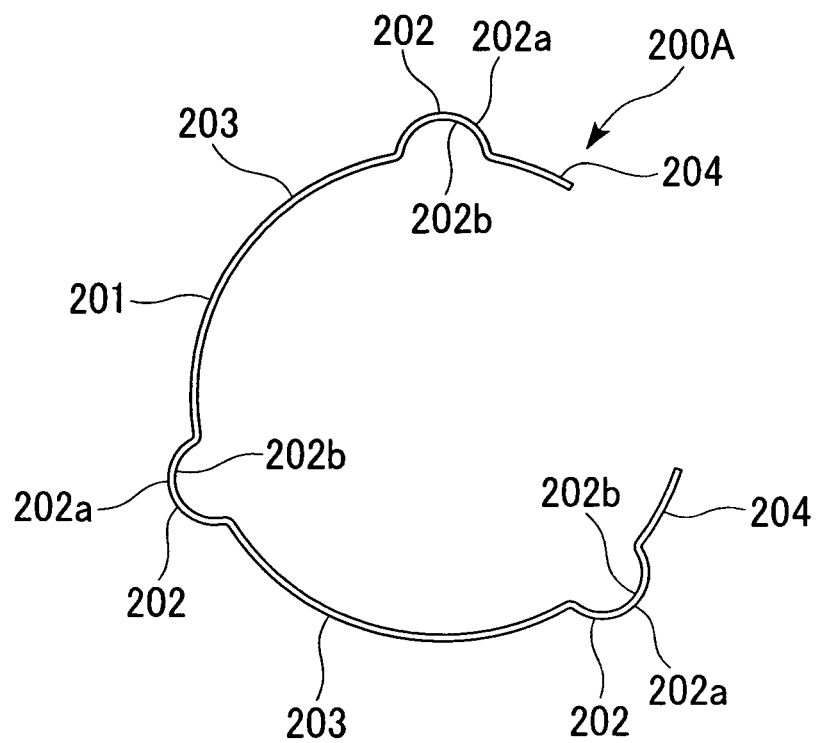
FIG. 11 is a front view showing a spacer of the disk brake in accordance with the second embodiment of the present invention.

In addition, even in the second embodiment, a spacer 200A formed of stainless steel is disposed inside the inner hole 65. The spacer 200A of the second embodiment is substantially the same as the spacer 200 of the first embodiment, but distinguished therefrom in that, as shown in FIG. 11, arc part 202 protruding outward in the radial direction in a semicircular shape are formed at three positions equal to the number of the axial grooves 72, two intermediate curved plate parts 203 are formed therebetween, and the entire outer circumference of the base plate part 201 is in contact with the inner circumference of the inner hole 65 of the cylinder tube part 50.

As shown in FIG. 9, the fixed ramp member 221 is press-fitted into the spacer 200A because an outer diameter of the sidewall part 226 is slightly smaller than an inner diameter of the base plate part 201 of the spacer 200A fitted into the inner hole 65 of the cylinder part 35. At this time, a diameter of a circle passing outer ends of the three convex parts 230 is larger than the inner diameter of the base plate part 201 of the spacer 200A, and smaller than a diameter of a circle passing a bottommost position in the inner surfaces 202b of the three arc part 202 of the spacer 200A fitted into the axial grooves 72. Accordingly, the fixed ramp member 221 is fitted into the inner hole 65 via the spacer 200A in a state in which the three convex parts 230 are disposed in the three arc part 202 in a one-to-one correspondence. As a result, as the tip surface parts 231 of the three convex parts 230 abut the inner surfaces 202b of the arc part 202 in a one-to-one correspondence, rotation relative to the cylinder part 35 having the three axial grooves 72 to which the arc part 202 are fitted is controlled. In other words, the cylinder part 35 controls rotation of the fixed ramp member 221 by receiving a rotational force introduced from the fixed ramp member 221 via the convex parts 230 to the axial grooves 72 with the arc part 202 of the spacer 200A interposed therebetween. More specifically, by inserting the convex parts 230 thereinto, the arc part 202 of the spacer 200A are disposed between the axial grooves 72 of the cylinder part 35 and the convex parts 230 to control rotation of the fixed ramp member 221. In addition, the convex parts 230 abut the curved inner surfaces 202b of the arc part 202 at the curved outer surfaces 231.

When the fixed ramp member 221 is fitted into the inner hole 65 of the cylinder part 35 via the spacer 200A, the convex parts 230 are disposed in the arc part 202 of the spacer 200A to control rotation relative to the cylinder part 35. Here, the convex party 230 of the fixed ramp member 221 and the axial grooves 72 of the cylinder part 35 constitute a rotation control part 232 for controlling rotation of the fixed ramp member 221 with respect to the cylinder part 35 in a circumferential direction of the cylinder, and the arc part 202 of the spacer 200A are disposed between the convex parts 230 and the axial grooves 72.

Figure 10A:
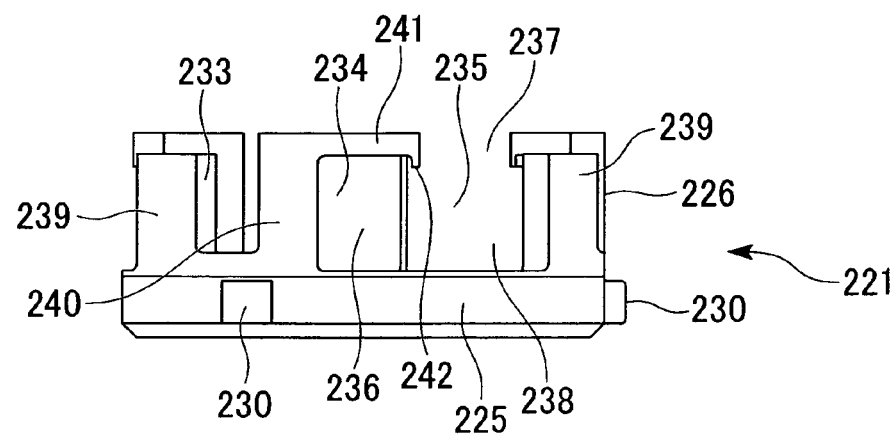
FIG. 10A is a front view showing a fixed ramp member of the disk brake in accordance with the second embodiment of the present invention.
Figure 10B:
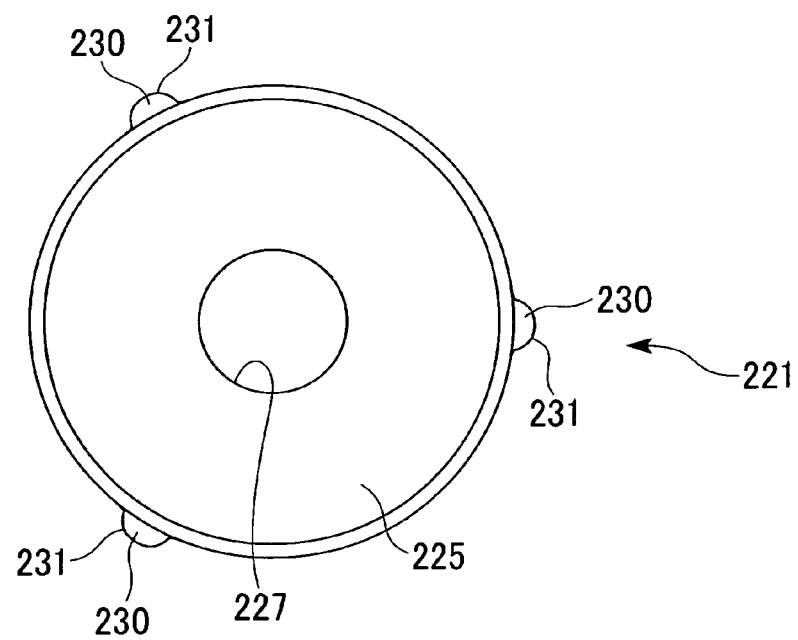
FIG. 10B is a bottom view showing the fixed ramp member of the disk brake in accordance with the second embodiment of the present invention.

As shown in FIG. 10A, a plurality of axial holes 233 having a certain width in the circumferential direction and extending in the axial direction but being opened opposite to the circular plate part 225 are formed at predetermined intervals in the circumferential direction in the sidewall part 226 of the fixed ramp member 221. In addition, hook-shaped holes 234 are formed between the axial holes 233 adjacent to each other in the circumferential direction. That is, the number of the hook-shaped holes 234 is equal to the number of the axial holes 233.

The hook-shaped holes 234 each have an axial hole 235 formed from the sidewall part 226 opposite to the circular plate part 225 to a front side of the circular plate part 225 in the axial direction, and a radial hole 236 adjacent to the axial hole 235 in the circumferential direction and formed at an intermediate part in the axial direction of the sidewall part 226 to pass therethrough in the radial direction. In other words, the axial hole 235 is formed at the sidewall part 226 in the axial direction to be opened at an opposite side of the circular plate part 225, and the radial hole 236 is formed at the sidewall part 226 in the axial direction to be blocked at an opposite side of the circular plate part 225.

By the axial hole 235 and the radial hole 236, the hook-shaped hole 234 constitutes a small width part 237 having a certain small width in the circumferential direction at an opposite side of the circular plate part 225, and constitutes a large width part 238 having a larger width than the small width part 237 in the circumferential direction at the circular plate part 225. In addition, the large width part 238 and the small width part 237 are flush with each other at one side in the circumferential direction of the sidewall part 226 and stepped at the opposite side. Accordingly, the sidewall part 226 includes a vertical wall part 239 having a certain width in the circumferential direction and vertically formed in the axial direction of the fixed ramp member 221 disposed between a portion in which the small width part 237 and the large width part 238 are continuously connected to each other and the axial hole 233, a vertical wall part 240 having a certain width in the circumferential direction and vertically formed in the axial direction of the fixed ramp member 221 disposed between a portion of the large width part in which a step shape of the large width part 238 and the small width part 237 is formed and the axial hole 233, and a locking extension wall part 241 forming the small width part 237 and extending from an end of the vertical wall part 240 opposite to the circular plate part 225 in the circumferential direction to partially cover the large width part 238. A locking protrusion 242 protrudes from an end of the locking extension wall part 241 opposite to the vertical wall part 240 in a direction of the circular plate part 225. A bottom surface of the large width part 238 and a lower surface of the locking extension wall part 241 are parallel to a bottom surface of the circular plate part 225.

Here, in the fixed ramp member 221, a height from the circular plate part 225 is higher at a side of the vertical wall part 240 on which the locking extension wall part 241 is formed than a side of the vertical wall part 239 having the certain width, and positions in the axial direction of the fixed ramp member 221 of a lower surface as an end surface of the locking extension wall part 241 adjacent to the circular plate part 225 and a surface as an end of the certain width of vertical wall part 239 opposite to the circular plate part 225 coincide with each other, in addition, the axial hole 235 of the hook-shaped hole 234 formed in the axial direction is larger than the diameter of the ball 222, and the ball 222 is insertable into the fixed ramp member 221 from the sidewall part 226 via the axial hole 235.

As shown in FIG. 9, the movable ramp member 223 includes a shaft part 245, and a circular plate part 246 extending from one end of the shaft part 245 in the radial direction in a concentric relationship. A plurality of ramp grooves 247 (only one is shown in FIG. 9) are formed at a surface of the circular plate part 246 adjacent to the shaft part 245 at predetermined intervals in the circumferential direction. While not shown, the ramp groove 247 has a mirror symmetrical shape with respect to a center portion in the circumferential direction of the circular plate part 246 such that a depth of the ramp groove 247 in the circumferential direction is largest at the center portion and gradually decreases toward both sides in the circumferential direction of the circular plate part 246. In the movable ramp member 223, the ball 222 is disposed in the ramp groove 247.

A chamfer part 248 is formed at an outer diameter side of a surface of the movable ramp member 223 opposite to the shaft part 245 of the circular plate part 246, and a relief concave part 249 is formed at a center portion of the surface. The shaft part 245 of the movable ramp member 223 has an insertion part 251 disposed adjacent to the circular plate part 246 and having a certain diameter, an annular relief groove 252 formed at a portion of the insertion part 251 opposite to the circular plate part 246, and a serration 253 formed at the entire circumference opposite to the insertion part 251 via the relief groove 252.

In the movable ramp member 223, in a state in which the ball 222 is disposed in the ramp groove 228 of the fixed ramp member 221, the ball 222 is disposed in the ramp groove 247, and the shaft part 245 is inserted into the through-hole 227 of the fixed ramp member 221. The shaft part 245 is further inserted to pass through the bottom hole 59 of the cylinder bottom part 51, and then the shaft part 245 is protruded outward from the cylinder bottom part 51. Here, the bottom hole 59 of the cylinder bottom part 51 includes a main hole part 59a formed at an outer side, and a large diameter hole part 59b formed at a bore 55 side and having a diameter larger than that of the main hole part 59a. In the bottom hole 59, a collar 258 having a flange part 257 formed at one end thereof is fitted into the main hole part 59a side of the large diameter hole part 59b by causing the flange part 257 to abut the main hole part 59a, and an O-ring 259 is fitted to the bore 55 side rather than the flange part 257 of the large diameter hole part 59b. The insertion part 251 of the shaft part 245 of the movable ramp member 223 is inserted into the through-hole 227, the O-ring 259 and the collar 258 of the fixed ramp member 221 such that the O-ring 259 seals a gap between the movable ramp member 223 and the cylinder part 35.

The serration 253 of the shaft part 245 of the movable ramp member 223 protrudes outward from the cylinder part 35. An electric drive mechanism 260 is provided outside the cylinder bottom part 51 of the caliper body 34 in the axial direction. The electric drive mechanism 260 electrically rotates the movable ramp member 223 by fitting to the serration 253.

An annular step part 261 is formed at an outer circumference of the cylinder bottom part 51 of the caliper body 34 in the axial direction. The electric drive mechanism 260 includes a case 262 fitted to the step part 261 to be mounted on the caliper body 34. The case 262 has a caliper body installation hole 263 fitted to the step part 261, and a seal groove 265 is formed at an end surface of the case 262 facing the caliper body 34 to surround the caliper body installation hole 263. A seal member 266 is disposed in the seal groove 265 to seal a gap between the case 262 and the caliper body 34. Here, the caliper body installation hole 263 includes, in a sequence from the caliper body 34, a fitting hole part 268 fitted to the step part 261, a stopper holding hole part 269 having a diameter slightly smaller than that of the fitting hole part 268 as shown in FIG. 8, a retainer holding hole part 270 having a diameter slightly smaller than that of the stopper holding hole part 269, and an end hole part 271 having a diameter smaller than that of the retainer holding hole part 270. An annular ring groove 272 is formed in a side of the stopper holding hole part 269 opposite to the retainer holding hole part 270.

A motor installation hole 275 is formed in the case 262 to be parallel to the caliper body installation hole 263. A motor 276 is provided in the motor installation hole 275 and fitted to the flange part 278 formed at one side of a body 277 of the motor 276 in the axial direction in a state in which the body 277 of the motor 276 protrudes at the caliper body 34 side. Here, a motor bracket 279 is fixed to a portion protruding from the motor installation hole 275 of the body 277 of the motor 276, the motor bracket 279 is mounted on an end surface of the case 262 adjacent to the caliper body 34, thereby the body 277 of the motor 276 is fixed to the case 262. A seal ring 280 is interposed between the body 277 of the motor 276 and the motor installation hole 275 to seal a gap therebetween. The motor 276 includes a rotary shaft 281 protruding into the case 262, and a motor pinion 283 having external teeth 282 is flitted to the rotary shaft 281 in a center fitting hole thereof 284.

An opening 288 is formed at a side of the case 262 opposite to the caliper body 34, and an end plate 289 is mounted to block the opening 288. Here, an annular seal groove 290 is formed at an end surface of the case 262 opposite to the motor 276 to surround the opening 288, and a seal member 291 is disposed in the seal groove 290 to seal a gap between the case 262 and the end plate 289.

A fitting hole 294 is formed between the motor installation hole 275 of the case 262 and the caliper body installation hole 263 to oppose the end plate 289. A fitting concave part 295 is formed at a position of the end plate 289 opposite to the fitting hole 294 to be recessed at a side opposite to the case 262, and both ends of a support shaft 296 are fixedly fitted to the fitting hole 294 and the fitting concave part 295. The support shaft 296 is parallel to the rotary shaft 281 of the motor 276, and a step gear 297 formed of synthetic resin is provided at the support shaft 296 to be rotated with respect to a fitting hole 298 formed at a center thereof. The step gear 297 includes large external gear 299 continuously engaged with the motor pinion 283, and small external gear 300 concentrically formed at the end plate 289 side rather than the large external gear 299 and having a dimension smaller than that of the large external gear 299.

A fitting concave part 303 is formed at the end plate 289 in a concentric relationship with respect to the shaft part 245 of the movable ramp member 223 and recessed at a side thereof opposite to the movable ramp member 223, and a support shaft 304 is fitted to the fitting concave part 303 at its one end. The support shaft 304 is parallel to the support shaft 296, and a step gear 305 formed of synthetic resin is provided at the support shaft 304 to be rotated with respect to a fitting hole 306 formed at a center thereof. The step gear 305 includes large external gear 307 continuously engaged with the small external gear 300 of the step gear 297, and small external gear 308 concentrically formed at a side of the large external gear 307 opposite to the end plate 289 and having a dimension smaller than that of the large external gear 307.

A retainer 313 having a cylindrical part 311 and an annular locking part 312 protruding radially inward from one end in the axial direction of the cylindrical part 311 is fitted into the retainer holding hole part 270 of the caliper body installation hole 263 in a state in which the annular locking part 312 is disposed at the end hole 271 side. A ring gear 315 having internal gear 314 formed therein is fitted inside the cylindrical part 311 of the retainer 313 to abut the annular locking part 312.

Here, a circular plate-shaped base gear 319 on which external gear 318 are formed is fitted to the serration 253 of the movable ramp member 223 to enable relative movement in the axial direction and prevent relative rotation in a serration hole 320 of a center thereof. A holding hole 321 parallel to the serration hole 320 is formed at the base gear 319 between the external gear 318 and the serration hole 320. A pin 322 is inserted into the holding hole 321. A planetary gear 324 having external gear 323 is held by the pin 322 to be rotated in the fitting hole 325 of the center thereof. That is the pin 322 has a flange part 328 formed at one end thereof and a ring groove 329 formed at the other end in the axial direction. The pin 322 abuts the base gear 319 at the side opposite to the planetary gear 324 with the flange part 328, and a C-shaped snap ring 330 fitted to a ring groove 329 abuts a spacer 331 disposed at the planetary gear 324 opposite to the base gear 319. Accordingly, the pin 322 holds the planetary gear 324 to the base gear 319. The external gear 323 of the planetary gear 324 is continuously engaged with the internal gear 314 of the ring gear 315 and the small external gear 308 of the step gear 305.

A stopper 337 including a cylindrical part 334, an annular separation-stop part 335 protruding radially inward from one end of the cylindrical part 334 in the axial direction, and an annular control part 336 protruding radially inward from the other end of the cylindrical part 334 in the axial direction to an extent larger than that of the annular separation-stop part 335 is fitted to the stopper holding hole part 269 of the caliper body installation hole 263 in a state in which the annular separation-stop part 335 is disposed at the retainer holding hole part 270 side. The annular separation-stop part 335 of the stopper 337 abuts the ring gear 315 to control separation of the retainer 313 holding the ring gear, and the annular control part 336 abuts the base gear 319 opposite to the planetary gear 324 to control movement of the base gear 319 toward the caliper body 34. In addition, a spacer 339 is disposed at the step gear 305 side of the base gear 319 and the spacer 339 abuts the support shaft 304 for the step gear 305, thereby controlling movement of the base gear 319 toward an opposite side of the caliper body 34.

Then, a C-shaped snap ring 340 is fitted to the ring groove 272 formed in the stopper holding hole part 269 of the caliper body installation hole 263 to stop separation of the stopper 337 with the snap ring 340.

As described above, the electric drive mechanism 260 includes the case 262, the motor 276, the motor bracket 279, the end plate 289, the motor pinion 283, the support shaft 296, the step gear 297, the support shaft 304, the step gear 305, the retainer 313, the ring gear 315, the base gear 319, the pin 322, the planetary gear 324, the stopper 337, the spacer 339, the snap ring 340, and so on.

Then, when the parking brake operation part provided in a driver's cabin is operated, the motor 276 rotates the rotary shaft 281 to rotate the motor pinion 283. Then, the step gear 297 in which the large external gear 299 are engaged with the external gear 282 of the motor pinion 283 is rotated, and the step gear 305 in which the large external gear 307 are engaged with the small external gear 300 is rotated. Then, while the planetary gear 324 in which the external gear 323 are engaged with the small external gear 308 of the step gear 305 is rotated (rotation), since the external gear 323 of the planetary gear 324 are also engaged with the inner gear 314 of the ring gear 315, which cannot be rotated, the planetary gear 324 revolves around the ring gear 315 (revolution) to rotate the base gear 319. Accordingly, the movable ramp member 223 of the ball and ramp mechanism 220 fitted to the serration. 253 in the serration hole 320 of the base gear 319 is rotated according to the rotation of the base gear 319. Then, as shown in FIG. 9, in a non-operation state of the ball and ramp mechanism 220 in which the ball 222 is held in the deepest portion of the ramp groove 228 of the fixed ramp member 221 and the deepest portion of the ramp groove 247 of the movable ramp member 223, the ball 222 moves to shallow portions of the ramp groove 228 of the fixed ramp member 221 and the ramp groove 247 of the movable ramp member 223 according to rotation of the movable ramp member 223. Accordingly, the movable ramp member 223 moves the serration 253 with respect to the serration hole 320 to straightly operate in the axial direction. That is the ball and ramp mechanism 220 converts rotation of the motor 276 into straight movement of the movable ramp member 223.

The parking brake mechanism 91 includes a sliding circular plate 351 provided in the cylinder part 35 and disposed at a side of the movable ramp member 223 of the ball and ramp mechanism 220 opposite to the shaft part 245 of the circular plate part 246, and a push rod 352 abutting the circular plate part 246 via the sliding circular plate 315 to interpose the sliding plate 315 therebetween and receiving a directly-operated pressure of the movable ramp member 223 to move in the axial direction of the cylinder part 35. That is, the push rod 352 is disposed in the cylinder part 35 and straightly moves in the same direction as the ball and ramp mechanism 220. In addition, a through-hole 353 is formed in a center portion of the sliding circular plate 315.

As shown in FIG. 8, the push rod 352 includes a substantially cylindrical shaft part 356, a substantially circular plate-shaped step part 357 extending radially outward from one end of the shaft part 356 in a concentric relationship, and a substantially circular-plate shaped flange part 358 extending radially outward from the step part 357 opposite to the shaft part 356 in a concentric relationship, which are integrally formed with each other. A male thread 359 is formed at an outer circumference of the shaft part 356 in the radial direction except for a portion thereof adjacent to the step part 357.

As shown in FIG. 9, the flange part 358 has substantially the same diameter as an end surface of the circular plate part 246 of the movable ramp member 223 opposite to the shaft part 245 to receive a directly-operated pressure of the movable ramp member 223 via the sliding circular plate 351. A plurality of protrusions 360 (only one is shown in FIG. 9) having a certain width in a circumferential direction and extending radially outward from the outer circumference of the flange part 358 are formed at predetermined intervals in the circumferential direction. The protrusion 360 includes, along the chamfer part 248 of the circular plate part 246 of the movable ramp member 223, an inclined part 361 inclined radially outward to be disposed at the movable ramp member 223, and a slide part 362 protruding radially outward from a tip of the inclined part 361. The push rod 352 has a positioning convex part 363 formed at a center of the flange part 358 and protruding toward the movable ramp member 223. When the sliding circular plate 351 is held between the positioning convex part 363 and the movable ramp member 223, the positioning convex part 363 is fitted to the through-hole 353 of the sliding circular plate 351 to be inserted into the separation concave part 249 of the movable ramp member 223 to hold the sliding circular plate 351 at a center position. In addition, three or more protrusions 360 are formed at the push rod 352, and the inclined parts 361 of the protrusions 360 are formed along the chamfer part 248 of the movable ramp member 223, so that the flange part 358 is maintained at the movable ramp member 223 in a concentric relationship.

Further, the plurality of protrusions 360 of the push rod 352 are slidably fitted to the plurality of axial holes 233 of the fixed ramp member 221 in the slide part 362 in a one-to-one correspondence. As a result, the push rod 352 is in a state of controlling rotation in the axial direction with respect to the fixed ramp member 221. In addition, the push rod 352 can slide (i.e., separate or approach) in the axial direction as the slide part 362 slides along the axial hole 233. Here, the plurality of protrusions 360 of the push rod 352 and the plurality of axial holes 233 of the fixed ramp member 221 constitute an anti-rotation and slide mechanism 365 provided between the fixed ramp member 221 and the push rod 352 and abutting each other with respect to the rotation direction of the movable ramp member 223 to control relative rotation between the fixed ramp member 221 and the push rod 352 and allow straight movement of the push rod 352.

Then, as shown in FIG. 8, the female thread 145 of the clutch member 146 as described in the first embodiment is threadedly engaged with the male thread 359 formed at the shaft part 356 of the push rod 352.

Therefore, when the movable ramp member 223 of the ball and ramp mechanism 220 is rotated to straightly move the movable ramp member 223 toward the push rod 352, the push rod 352 is pressed by the movable ramp member 223 to straightly move along the axial direction, and the clutch member 146 pressed by the push rod 352 is straightly moved in the axial direction, as described in the first embodiment, so that the piston 77 is forcedly slid toward the pads 12 with respect to the cylinder part 35.

The parking brake mechanism 91 of the second embodiment includes a cover member 370 (spring cover) provided to cover a portion of the push rod 352, a push rod biasing spring 176 disposed between the flange part 358 of the push rod 352 and the piston 77 of the cover member 370 to bias the push rod 352 toward the ball and ramp mechanism 220 as described in the first embodiment, and a snap ring 177 fitted into the ring groove 67 of the cylinder part 35 to lock the cover member 370 to the cylinder part 35.

Figure 12:
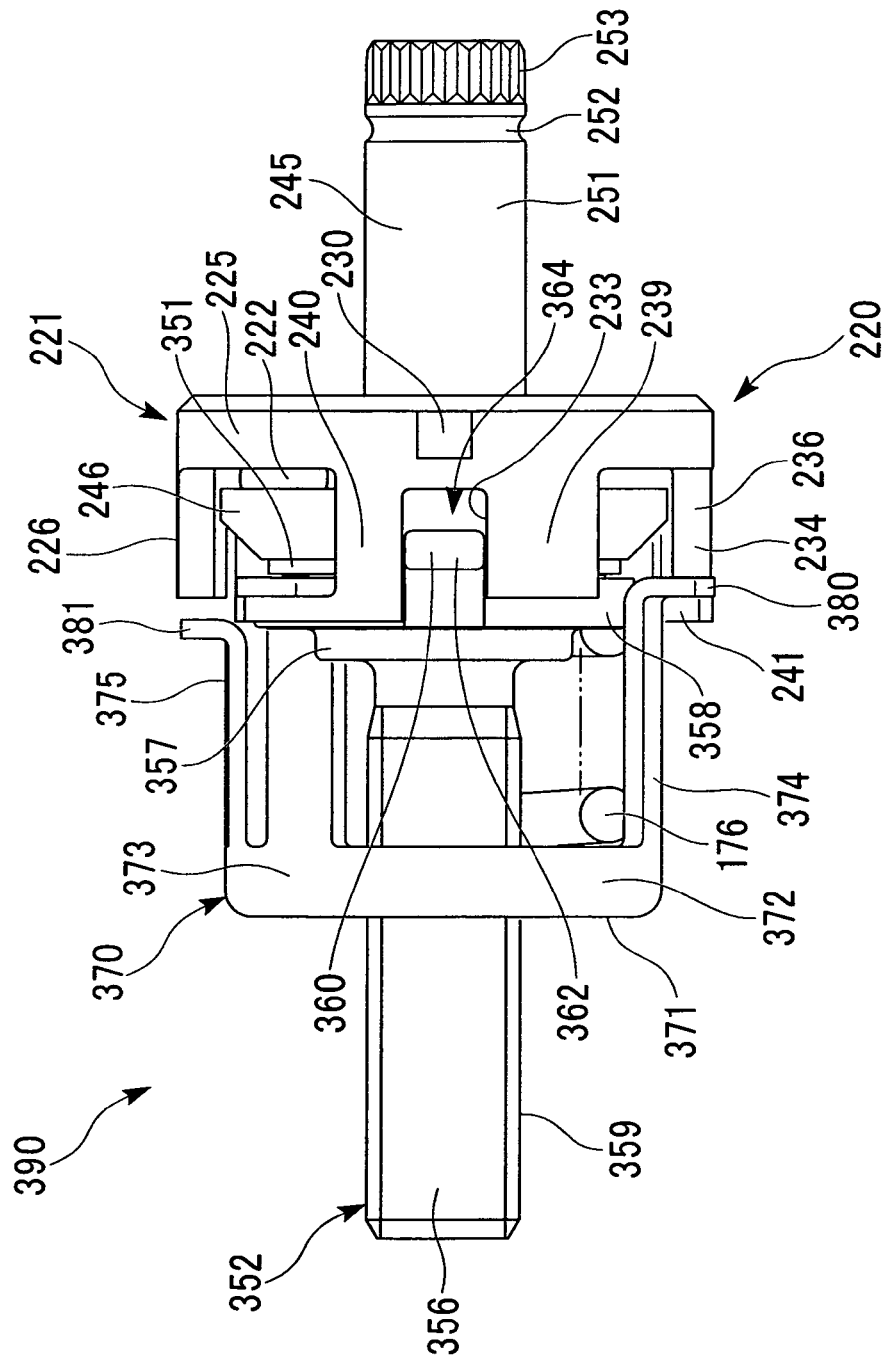
FIG. 12 is a side view showing a cartridge of the disk brake in accordance with the second embodiment of the present invention.

The cover member 370 has a cup shape and includes a ring-shaped bottom part 371 into which the clutch member 146 is inserted, and a sidewall part 372 extending from an outer edge of the ring-shaped bottom part 371 in the axial direction. As shown in FIG. 12, the sidewall part 372 is formed of a cylindrical base part 373 in which a portion connected to the ring-shaped bottom part 371 extends in the axial direction to form a certain length of cylindrical shape. In addition, the sidewall part 372 includes long extension parts 374 having a certain width in the circumferential direction and extending from the cylindrical base part 373 in the axial direction at an opposite side of the ring-shaped bottom part 371 at predetermined intervals in the circumferential direction (specifically, three positions), and short extension parts 375 having a certain width in the circumferential direction and extending from the cylindrical base part 373 in the axial direction at an opposite side of the ring-shaped bottom part 371 at predetermined intervals in the circumferential direction (specifically, three positions).

Ends of the long extension parts opposite to the ring-shaped bottom part 371 are bent radially outward to become a long position locking part 380. Ends of the short extension parts 375 opposite to the ring-shaped bottom part 371 are also bent radially outward to become a short position locking part 381. The long position locking part 380 and the short position locking part 381, which are alternately arranged with each other, are parallel to the ring-shaped bottom part 371. In addition, as described above, since an extended length of the long extension part 374 is longer than that of the short extension part 375, a distance of the long position locking part 380 of the long extension part 374 from the ring-shaped bottom part 371 is longer than a distance of the short position locking part 381 of the short extension part 375 from the ring-shaped bottom part 371.

As shown in FIG. 8, in the short position locking part 381, the cover member 370 is locked at the cylinder bottom part 51 of the snap ring 177 held in the ring groove 67 of the cylinder tube part 15. As a result, movement toward the cylinder opening part 52 is controlled. In addition, as shown in FIG. 12, the long position locking part 380 of the long extension part 374 of the cover member 370 can be inserted and locked in the hook-shaped hole 234 of the fixed ramp member 221. Specifically, the long position locking part 380 of the long extension part 374 is disposed in the radial hole 236 of the book-shaped hole 234 of the fixed ramp member 221 to be locked by the locking extension wall part 241 of the sidewall part 226.

The ball and ramp mechanism 220, the sliding circular plate 351, the push rod 352, the push rod biasing spring 176, and the cover member 370 maybe previously assembled to form a cartridge and then inserted into the caliper body 34.

That is, first, the fixed ramp member 221 is disposed in a state that the circular plate part 225 is directed downward, and the bail is inserted into the ramp groove 228 of the circular plate part 225 as shown in FIG. 9. Next, from the upper side, the movable ramp member 223 is inserted into the sidewall part 226 of the fixed ramp member 221 in a state in which the shaft part 245 is directed downward, and the shaft part 245 is inserted into the through-hole 227 of the fixed ramp member 221 to mount the circular plate part 246 on the ball 222. At this time, according to necessity, the movable ramp member 223 is rotated to cause the ball 222 to abut the ramp groove 247 of the movable ramp member 223 without movement of the fixed ramp member 221 from the ramp groove 228. In this state, the circular plate part 246 of the movable ramp member 223 is opposite to the circular plate part 225 of the fixed ramp member 221. Next, after laying the sliding circular plate 351 on the circular plate part 246 of the movable ramp member 223 at a position where the through-hole 353 fits in the separation concave part 249, the flange part 358 of the push rod 352 is directed downward, the slide part 362 of the protrusion 360 is inserted into the axial hole 233 of the fixed ramp member 221, and the positioning convex part 363 is inserted into the through-hole 353 and the separation concave part 249 to be mounted on the sliding circular plate 351. Next, the push rod biasing spring 176 is mounted on the flange part 358 of the push rod 352 so as to insert the shaft part 356 of the push rod 352 shown in FIG. 12 therein. Next, the long position locking part 380 and the short position locking part 381 of the cover member 370 are directed downward, the shaft part 356 and the push rod biasing spring 176 of the push rod 352 are inserted into the sidewall part 372, and the shaft part 356 of the push rod 352 is inserted inside the ring-shaped bottom part 371.

Then, the ball 222, the movable ramp member 223, the sliding circular plate 351, the push rod 352, the push rod biasing spring 176 and the cover member 370 are sequentially assembled to the fixed ramp member 221. A phase of the long extension part 374 is aligned with the small width part 237 of the hook-shaped hole 234 of the fixed ramp member 221, the cover member 370 is pressed against the fixed ramp member 221, the push rod biasing spring 176 is shortened or lengthened, and the long position locking part 380 of the long extension part 374 is inserted into the small width part 237 shown in FIG. 10A. When the long position locking part 380 is positioned under the locking protrusion 242, the cover member 370 is rotated with respect to the fixed ramp member 221, and the long position locking part 380 is disposed under the locking extension wall part 241 in the large width part 238, releasing the pressure.

Then, as shown in FIG. 12, the cover member 370 causes the long position locking part 380 to abut the locking extending wall part 241 using a biasing force of the push rod biasing spring 176. Accordingly, the long position locking part 380 of the long extension part 374 of the cover member 370 abuts the locking extension wall part 241 of the fixed ramp member 221 by the biasing force of the push rod biasing spring 176 to be locked to the hook-shaped hole 234 of the fixed ramp member 221. Moreover, rotation of the long position locking part 380 is controlled by the locking protrusion 242 and the vertical wall part 240 of the fixed ramp member 221, and the cover member 370 is mounted on the fixed ramp member 221. Then, in this state, a phase of the short position locking part 381 of the short extension part 375 is aligned with the small width part 237 of the fixed ramp member 221, and the short position locking part 381 of the short extension part 375 can be inserted into the small width part 237. In addition, in order to install the above configuration, in a state in which the phase of the long position locking part 380 of the long extension part 374 is aligned with the small width part 237, the phase of the short position locking part 381 of the short extension part 375 is aligned with the vertical wall part 239 having a small height. The height of the vertical wall part 239 is configured such that the long position locking part 380 of the long extension part 374 is inserted into the small width part 237 to be disposed under the locking protrusion 242 and then abut the short position locking part 381 of the short extension part 375.

As described above, the ball and ramp mechanism 220, the sliding circular plate 351, the push rod 352, the push rod biasing spring 176 and the cover member 370 are previously assembled to form a cartridge 390 as a single assembly, constituting the parking brake mechanism.

While the cartridge 390 assembled as described above is assembled into the cylinder part 35 (cylinder bore 55) of the caliper body 34, before that, the collar 258 and the O-ring 259 are disposed in the bottom hole 59 of the caliper body 34 shown in FIG. 9, and the spacer 200A is held in the inner hole 65 in a state in which the three arc part 202 are fitted into the three axial grooves 72.

Then, the cartridge 390 is inserted into the inner hole 65 of the cylinder part 35 of the caliper body 34 shown in FIG. 8 from the cylinder opening 52 into the cylinder tube part 50, with the shaft part 245 of the movable ramp member 223 protruding in the axial direction being at the front. At this time first, the shaft part 245 of the movable ramp member 223 shown in FIG. 9 is inserted into the O-ring 259 and the collar 258 in the bottom hole 59 of the cylinder bottom part 51. Accordingly, movement of the cartridge 390 in the radial direction of the cylinder part 35 is controlled.

Moreover, when the shaft part 745 of the movable ramp member 223 is inserted into the bottom hole 59, generally, the convex part 230 of the fixed ramp member 221 protruding outward in the radial direction of the cartridge 390 abuts the bottom surface 74 of the sliding hole 66 of the cylinder tube part 50. In this state, the cartridge 390 is rotated to align the phase of the three convex parts 230 with the phase of the three arc part 202 of the spacer 200A fitted into the axial grooves 72. Then, as the cartridge 390 can be further inserted, the three convex parts 230 are moved in the three arc part 202 of the spacer 200A in the axial direction of the cylinder part 35, and simultaneously, the cartridge 390 is further inserted such that the fixed ramp member 221 abuts the bottom surface 56 of the cylinder bottom part 51 to stop the cartridge 390. In addition, at this time, the push rod 352 of the cartridge 390 is whirl-stopped by the protrusions 360 with respect to the fixed ramp member 221 of the ball and ramp mechanism 220, and the three convex parts 230 of the fixed ramp member 221 are disposed in the arc parts 202 of the spacer 200A to be whirl-stopped with respect to the cylinder part 35 having the three axial grooves 72 to which the arc parts 202 are fitted. That is the rotation control part 232 constituted by the three convex parts 230 and the three axial grooves 72 is provided around the cartridge 390 in the radial direction to control relative rotation between the cartridge 390 and the cylinder part 35, and the spacer 200A formed of stainless steel and including the three arc parts 202 having the same shape as the three axial grooves 72 is disposed between the three convex parts 230 and the three axial grooves 72 to be resiliently fitted to the inner circumference of the cylinder part 35.

Next, the snap ring 177 is mounted in the cylinder part 35. That is, the snap ring 177 is inserted from the cylinder opening part 52 to press the snap ring 177 against the short position locking part 381 of the cover member 370. When the cartridge 390 including the cover member 370 is pressed into the cylinder bottom part 51, the push rod biasing spring 176 is shortened or lengthened to move the cover member 370 toward the cylinder bottom part 51. When the snap ring 177 is fitted into the ring groove 67 to be mounted in the cylinder part 35, the snap ring 177 locks the short position locking part 381 of the cover member 370. As a result, separation of the cartridge 390 from the cylinder part 35 is stopped by the snap ring 177.

After that, the piston assembly 191 as described in the first embodiment is disposed in the cylinder part 35 in a state in which the male thread 359 of the push rod 352 is threadably engaged with the female thread 145 of the clutch member 146. Next, the caliper 13 is assembled, through an assembly operation as described in the first embodiment.

In the disk brake 10 of the second embodiment, the parking brake operation part (not shown) is operated to rotate the motor 276 of the electric drive mechanism 260. When the movable ramp member 223 of the ball and ramp mechanism 220 is rotated, the ball 222 is moved to a shallow side of the ramp groove 228 of the fixed ramp member 221, and simultaneously, moved to a shallow side of the ramp groove 247 of the movable ramp member 223. As a result, the movable ramp member 223 is pressed by the ball 222 to straightly move. Then, the movable ramp member 223 moves the push rod 352 toward the disk 14 with respect to the cylinder part 35 in a non-rotation manner while moving the slide part 362 of the protrusion 360 toward the axial hole 233 of the fixed ramp member 221 fixed to the cylinder part 35. Then, the clutch member 146 is moved with the push rod 352 to move the piston 77 toward the disk 14, mechanically pressing the pair of pads 12 against the disk 14.

Meanwhile, the brake fluid pressure is introduced between the cylinder part 35 and the piston 77 due to a brake operation by the conventional brake pedal, and, like the first embodiment, the piston 77 moves toward the disk 14 to press the pair of pads 12 against the disk 14.

In addition, even in the second embodiment, the ball and ramp mechanism 220, the sliding circular plate 351, the push rod 352, the push rod biasing spring 176 and the cover member 370 may not be assembled as a cartridge 390 as a single assembly but may be separately assembled to the cylinder part 35.

According to the disk brake 10 of the second embodiment as described above, the rotation control part 232 for controlling relative rotation between the cylinder part 35 of the caliper body 34 formed of an aluminum alloy and the cartridge 390 in the circumferential direction of the cylinder includes the convex parts 230 of the fixed ramp member 221 formed of iron, disposed at the cartridge 390 and having curved outer surfaces 231, and the axial grooves 72 formed at the cylinder part 35 and having the curved inner surfaces 72a, and the spacer 200A formed of stainless steel and including the arc part 202 having the same shape as the axial grooves 72 is disposed between the convex parts 230 and the axial grooves 72 to be resiliently fitted into the inner circumference of the cylinder part 35. Accordingly, even when a large rotational force is applied to the convex parts 230, since the convex part 230 does not directly abut the axial groove 72 to remove possibility of abrading the cylinder part 35 formed of an aluminum alloy by the convex part 230 formed of iron, it is possible to prevent contamination of the abraded foreign substances and improve reliability.

In addition, the ball and ramp mechanism 220 is provided in the cartridge 390, and the convex parts 230 are formed at the fixed non-rotation ramp member 221 among the ball and ramp mechanism 220. For this reason, it is possible to reduce an axial width of the spacer 200A and save the weight, without axial movement of the convex parts 230.

According to the first and second embodiments, a disk brake includes a pair of pads disposed at both sides of a disk, a caliper for slidably fitting a piston into a bottomed cylinder formed of an aluminum alloy and bringing the pair of pads in contact with the disk using slide movement of the piston, and a parking brake mechanism for mechanically protruding the piston to press the pads against the disk to generate a braking force, the parking brake mechanism includes a spring cover into which a push rod and a push rod biasing spring are inserted, a rotation control part for controlling relative rotation between the parking brake mechanism and the cylinder in a circumferential direction of the cylinder is provided around the parking brake mechanism in a radial direction, the rotation control part includes convex parts having curved surfaces formed at the parking brake mechanism and concave parts having curved surfaces formed at the cylinder, and a spacer formed of stainless steel, resiliently fitted into an inner circumference of the cylinder and including arc part having the same shape as the concave parts is disposed between the convex parts and the concave parts. Accordingly, since the convex parts do not abut the concave parts formed in the cylinder formed of an aluminum alloy, it is possible to prevent abrasion of the cylinder formed of an aluminum alloy by the convex parts, improving reliability.

In addition, since the spacer is resiliently fitted into the inner circumference of the cylinder and includes the arc part having the same shape as the concave parts, the arc part do not move in the circumferential direction of the cylinder with respect to the concave parts, and there is no possibility of abrading the cylinder formed of an aluminum alloy by the arc part. Accordingly, it is possible to further improve reliability.

In addition, according to the first and second embodiments, the spacer has a substantial C shape and arc part formed at portions thereof. For this reason, the spacer can be easily and securely fitted into the inner circumference of the cylinder. Accordingly, it is possible to further improve reliability. Further, the spacer is not limited to the C shape, for example, but may have a semi-circular shape from which the pair of end-side curved plate parts 204 shown in FIG. 6A are removed, a circular shape in which the pair of end-side curved plate parts 204 extend to overlap each other, or a polygonal, non-circular shape, in which an opening is formed at a portion thereof and the number of arc part corresponding to the axial grooves 72 are formed.

Furthermore, according to the first and second embodiments, while an introduction hole of an operating fluid is formed in a fitting portion of the cylinder to the spacer. Although the spacer blocks the introduction hole, since the spacer has a plurality of through-holes, the through-holes secure introduction and discharge of the brake fluid into/from the cylinder. Accordingly, it is possible to maintain introduction and discharge performance of the brake fluid into/from the cylinder through the introduction hole. In addition, the number of the through-holes may be one to correspond to the introduction hole for the operating fluid, or the plurality of through-holes may be omitted when the introduction hole is formed at a portion of the cylinder other than the fitting portion to the spacer.

In addition, according to the first embodiment, while the convex parts are formed at the push rod moving in the cartridge in the axial direction, the spacer may be provided to secure slidability of the push rod in the axial direction.

Further, according to the second embodiment, the ball and ramp mechanism is provided in the cartridge, and the convex parts are formed at the fixed non-rotation ramp member among the ball and ramp mechanism. For this reason, axial movement of the convex part is controlled, an axial width of the spacer can be reduced, and weight saving can be performed.

As described above, while the convex parts are formed at the push rod or the fixed non-rotation ramp member, the convex parts are not limited thereto but may be provided at the spring cover of the cartridge. In this case, the whirl-stop member in the cartridge is axially movably engaged with the spring cover.

While the invention has been shown and described with reference to certain example embodiments thereof, it will be understood by those skilled in the art that various changes in form and details may be made therein without departing from the spirit or scope of the invention as defined by the appended claims.

What is claimed is:

1. A disk brake, comprising:
   a pair of pads disposed at both sides of a disk;
   a caliper for slidably fitting a piston into a bottomed cylinder formed of an aluminum alloy and bringing the pair of pads in contact with the disk using slide movement of the piston;
   a parking brake mechanism for generating a braking force having a spring cover into which a push rod and a push rod biasing spring are inserted, mechanically protruding the piston to press the pads against the disk;
   a rotation control part for controlling relative rotation provided in between the cylinder and a part of the parking brake mechanism that does not rotate with respect to the push rod, the rotation control part including convex parts having curved surfaces formed at the part of the parking brake mechanism that does not rotate with respect to the push rod and concave parts having curved surfaces formed at the cylinder; and
   a metal spacer resiliently disposed in an inner circumference of the cylinder and including arc parts that contact with the concave parts and are disposed in the concave parts wherein an introduction hole for an operating fluid is formed at a fitting portion of the cylinder adjacent to the spacer, and a plurality of through-holes are formed in the spacer.

2. The disk brake according to claim 1, wherein the spacer is formed of a stainless steel.

3. The disk brake according to claim 1, wherein the convex parts are formed at the push rod.

4. The disk brake according to claim 1, wherein the arc parts have substantially the same shape as the concave parts.

5. The disk brake according to claim 1 further comprising:
   a clutch member that is provided on the push rod, the clutch member moving the piston by a relative rotation generated by a threadable engagement with the push rod.

6. The disk brake according to claim 1, wherein the spacer is substantially C-shaped, and the arc parts are formed at portions thereof.

7. The disk brake according to claim 6, wherein the convex parts are formed at the push rod.

8. The disk brake according to claim 6, wherein the arc parts have substantially the same shape as the concave parts.

9. The disk brake according to claim 1, wherein the metal spacer is resiliently fitted to the inner circumference of the cylinder, and wherein an outer diameter of the metal spacer, in a natural state, with no forces applied, is larger than a diameter of the inner circumference of the cylinder.

10. The disk brake according to claim 9, wherein the spacer is substantially C-shaped, and the arc parts are formed at portions thereof.

11. The disk brake according to claim 9, wherein the arc parts have substantially the same shape as the concave parts.

* * * * *